United States Patent
Chen et al.

(10) Patent No.: US 7,487,933 B1
(45) Date of Patent: Feb. 10, 2009

(54) HOMING MISSILE GUIDANCE AND ESTIMATION ALGORITHMS AGAINST ADVANCED MANEUVERING TARGETS

(76) Inventors: Robert H. Chen, 1545 Amherst Ave., Apt 304, Los Angeles, CA (US) 90025; Ashitosh Swarup, 10949 Palms Blvd., #3, Los Angeles, CA (US) 90034; Jason Lee Speyer, 11358 Chalon Rd., Los Angeles, CA (US) 90049

( * ) Notice: Subject to any disclaimer, the term of this patent is extended or adjusted under 35 U.S.C. 154(b) by 64 days.

(21) Appl. No.: 11/428,785

(22) Filed: Jul. 5, 2006

Related U.S. Application Data

(60) Provisional application No. 60/696,739, filed on Jul. 5, 2005.

(51) Int. Cl.
  *F42B 15/01* (2006.01)
  *G06F 19/00* (2006.01)
  *F41G 7/00* (2006.01)
  *F42B 15/00* (2006.01)
(52) U.S. Cl. .................. 244/3.15; 244/3.1; 89/1.11
(58) Field of Classification Search ........... 244/3.1–3.3; 89/1.11; 701/1, 3, 23, 27; 342/61–68
  See application file for complete search history.

(56) References Cited

U.S. PATENT DOCUMENTS

| | | | | |
|---|---|---|---|---|
| 5,671,138 A | * | 9/1997 | Bessacini et al. | ......... 244/3.15 |
| 5,671,140 A | * | 9/1997 | Bessacini et al. | ......... 244/3.15 |
| 5,862,496 A | * | 1/1999 | Biven | ......... 244/3.15 |
| 5,944,762 A | * | 8/1999 | Bessacini et al. | ......... 244/3.15 |

* cited by examiner

*Primary Examiner*—Bernarr E Gregory
(74) *Attorney, Agent, or Firm*—Michael Blaine Brooks, P.C.; Michael B. Brooks

(57) ABSTRACT

A system, processing structure and method for performing vehicle intercept includes target acceleration estimation or blocking via a filter prior to deriving an interceptor acceleration time history via a guidance law. In the processing structure where the unknown target accelerations are blocked from affecting estimates, a guidance law is generated, stored and retrieved accounting for worst case target acceleration. In the processing structure where the target acceleration is presumed constant with a constant bank angle, the guidance law is closed form, exploiting constant heading angular velocity, and thus generated online.

9 Claims, 9 Drawing Sheets

HOMING MISSILE GUIDANCE AND ESTIMATION ALGORITHMS AGAINST ADVANCED MANEUVERING TARGETS

CROSS-REFERENCE TO RELATED APPLICATIONS

This application claims the benefit of provisional application No. 60/696,739, filed Jul. 5, 2005, the disclosure and appendices of which are hereby incorporated by reference herein, in their entirety, for all purposes.

BACKGROUND OF THE INVENTION

1. Technical Field

The present invention, in its several embodiments, relates to vehicle intercept methods and intercept processing structures and more particularly to the methods of, and processing systems for intercept estimation and interceptor guidance applied to maneuvering targets.

2. State of the Art

Because the process of proportional navigation of an interceptor does not yield a solution to the intercept of maneuvering targets, several advanced guidance laws and intercept geometry filtering techniques have been developed in attempts to accommodate the targets having time variation in the magnitude or direction of their respective velocity vectors. One approach in the construction of the filter and guidance law that has been applied to maneuvering target has been to use a target model, typically a discrete mathematical representation, in which the target is presumed to perform particular maneuvers. Based on such a target model, a guidance filter can be developed to estimate the relative target-to-interceptor position and velocity and target acceleration, as state estimates for example. Furthermore, the associated guidance law, which generates the interceptor's acceleration command using the state estimates, can be developed subject to the presumed engagement dynamics. However, a considerable drawback wit this target model approach is that the target acceleration cannot be easily modeled because the time history of the target acceleration is inherently a jump process whereby the acceleration levels and switching times are unknown a priori. Therefore, there remains a need for a more realistic target model and the associated filter and guidance law based on this target model.

Instead of presuming a target model, another approach for constructing the guidance law is to presume the worst possible target acceleration within the interceptor engagement scenario; i.e. the target is assumed to be intelligent, or at least aware of the interceptor, and tries to maximize the miss distance. In the problem formulation, the pursuer, i.e., interceptor, wishes to minimize the terminal miss whereas the evader, i.e., target, wishes to maximize it. Therefore, the guidance law for the interceptor is determined based on the anticipated worst possible target acceleration, i.e., based on game theoretic principals. Since this guidance law presumes that the engagement states are known by both players, the implementation requires that noisy information be processed through a filter. The filter that is usually chosen also presumes the worst possible target acceleration. However, if the target does not execute according to its assumed strategy, the filter performance can degrade rapidly, and thereby, produce large miss distances. Therefore, there remains a need for a accommodating filtering techniques that may be used with the type of guidance laws based on a game theoretic solution.

SUMMARY OF THE INVENTION

The invention, in its several embodiments of methods and processing structures, generates estimations of intercept and homing missile guidance commands based on the presumption that certain targets execute evasive maneuvers orthogonal to their velocity vectors. The method and processing structure embodiments of the present invention estimate the engagement states in the presence of large and arbitrary target maneuvers and, each processing structure, as a cascade of a filter followed by a guidance law, guide the interceptor, typically by way of acceleration commands orthogonal to the interceptor's velocity vector, in order to hit, or come near to, the target based on these estimated engagement states. One exemplary process and filtering technique constructs the filter by blocking the dynamic effect of the unknown target acceleration and the guidance law based on the anticipated worst possible target acceleration. The relative velocity in the direction of the unknown target acceleration may be constructed directly from the measurements or derived measurements. Another exemplary process and filtering structure constructs the filter that estimates the target acceleration and the guidance law based on a target model in which the target acceleration is assumed to have constant magnitude and constant bank angle rate. The first exemplary process and filtering structure avoids estimating the target acceleration, but must use unfiltered state estimates in the direction of the unknown target acceleration. The second exemplary process and filtering structure works to estimate the target acceleration, but the convergence of this estimate is latent causing miss distance errors.

BRIEF DESCRIPTION OF THE DRAWINGS

For a more complete understanding of the present invention in its several embodiments, and for further features and advantages, reference is now made to the following description taken in conjunction with the accompanying drawings, in which.

DETAILED DESCRIPTION

1. Introduction

The following describes methods and systems for performing the intercept of one vehicle by another. An exemplary embodiment of the system and method embodiments of the present invention may be applied to addresses what is termed in the art as the missile-target intercept problem where one interceptor, or missile, attempts to intercept, or otherwise come into close spatial proximity with, another vehicle such as an incoming weapon that itself acts as an evader. Embodiments of the invention that are the methods and systems have an estimation processing structure and a guidance processing structure that function together to reduce the terminal miss distance between the target and the interceptor.

Figure 1:
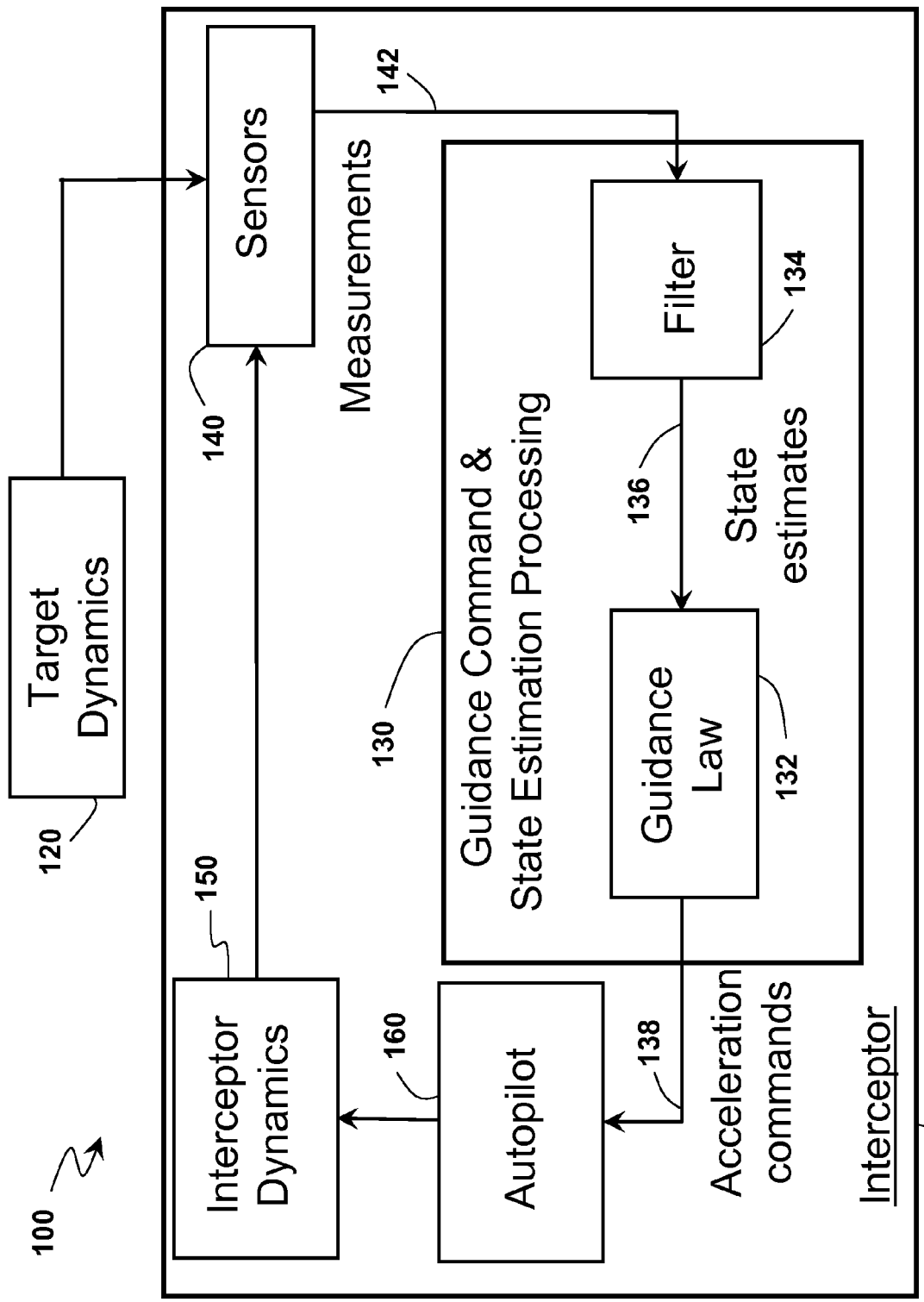
FIG. 1 is an exemplary top level functional block diagram of the homing missile guidance and estimation processing structure.

FIG. 1 illustrates a top level functional block diagram representation of the interceptor system 100 having an interceptor 110 and the ability to account for target dynamics 120. In this example, the interceptor 110 has guidance command and state estimation processing unit 130 that includes the filter processing structure 134 and the guidance law processing structure 132. The filter processing structure 134 may embodied as instructions executed by a general processor making the general processor function as a special processor or may be embodied as permanent instruction in an application specific integrated circuit or in any combination of the two. The guidance law processing structure 132 may embodied as instructions executed by a general processor making the general processor function as a special processor or may be embodied as permanent instruction in an application specific integrated circuit or in any combination of the two, or other electrically equivalent means. Accordingly, the filter processing structure 134 and the guidance law processing structure 132, as instructions, may be executed by one or more processors within the guidance command and state estimation processing unit 130. The guidance command and state estimation processing unit 130 takes in measurements 142 from one or more sensors 140 and outputs acceleration commands 138 to the autopilot 160. The autopilot 160 is typically as system within the interceptor 110 that attempts to generate accelerations in the direction and magnitude corresponding to the acceleration commands 138 form the guidance law 132. The autopilot 160 may include control instructions executed via a processor that: (a) takes in angular body rotation measurements and linear acceleration measurements corresponding to the angular velocity and changes in the linear velocity of the interceptor 110; and (b) puts out commands to effectors such as control surface actuators, thrust vector actuators, and/or reaction control jets. The effects of the autopilot and the interceptor's aerodynamics are represented by the block labeled interceptor dynamics 150. The one or more sensors 140 provide the combination of the target dynamics 120 and interceptor dynamics 150 as measurements 142 as well as measurements of interceptor velocity and interceptor acceleration.

1.1 Overview

Two exemplary methods and processing structures for homing missile guidance and estimation based on the assumption that certain targets execute evasive maneuvers orthogonal to their velocity vectors are disclosed. Both exemplary methods and processing structures estimate the engagement states in the presence of large and arbitrary target maneuvers and generate guidance signals, e.g., autopilot acceleration commands, to guide the interceptor to hit the target based on these state estimates.

Figure 2:
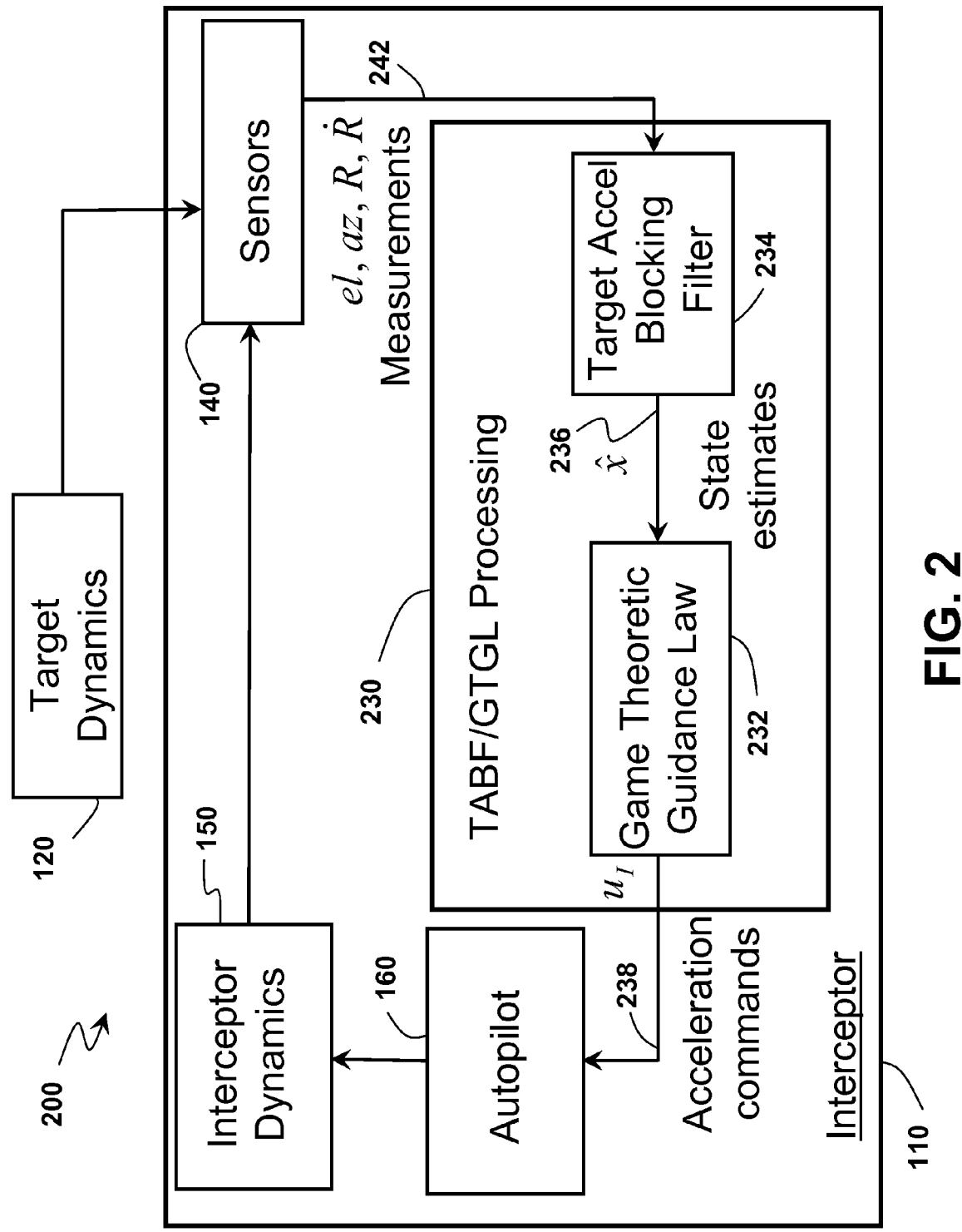
FIG. 2 is an exemplary top level functional block diagram of the Target Acceleration Blocking Filter/Game Theoretic Guidance Law (TABF/GTGL) processing structure.

The first exemplary method and processing structure, the Target Acceleration Blocking Filter (TABF/GTGL), may be derived by applying the linear-exponential-Gaussian (LEG) differential game with different information patterns or its limit, the linear-quadratic-Gaussian (LQG) differential game. In the problem formulation, the interceptor seeks to minimize the terminal miss distance whereas the target seeks to maximize it. Therefore, the guidance law, e.g., the GTGL, for the interceptor is determined based on the anticipated worst possible target motion similar to that of the linear-quadratic pursuit-evasion game (LQPEG). Since LQPEG assumes the engagement states are known by both players, implementation requires that noisy information be processed through a filter. The filter that may be typically applied in the LQPEG assumes the strategy of the target. However, if the target does not play its assumed strategy, then the filter performance can degrade rapidly, and thereby, produce unacceptable miss distances. Instead of assuming the strategy of the target, the filters, e.g., the TABF, in the LEG and LQG differential games block the dynamic effect of the target in the direction of the unknown target acceleration. In effect, this requires the TABF to process its measurements with zero memory in a subspace associated with the direction of the unknown target acceleration. Therefore, the relative velocity in the direction of the unknown target acceleration is constructed directly from the measurements. From the same estimates of the TABF, the guidance law obtained by the game theory described above may now be applied. Since the target acceleration is not estimated, the TABF will not have the estimated lag but will have increased estimation uncertainty because unfiltered state estimates are used in the direction of the unknown target acceleration. Furthermore, since no target model is used in the problem formulation, the filter structure and implementation are much simpler and the computation requirement is a lot less. Finally, since there is no assumption made on the target, the TABF will perform well for a range of different target accelerations. FIG. 2 illustrates in a top level block diagram 200 the TABF/GTGL processing 230 having a target acceleration blocking filter 234 taking in measurements representative of the combined intercept dynamics of the target dynamics 120 and the interceptor dynamics 150, where the exemplary measurements 242 include and elevation angle, el, and azimuth angle, az, relative range, R, and relative range rate, $\dot{R}$. In addition, the interceptor velocity and interceptor acceleration may be provided as measurements. The one or more sensors 140 of the interceptor need not output the exemplary measurements 242, but instead output components, i.e., constituent elements, of the exemplary measurements 242, from which the exemplary measurements 242 may be formed or derived. The game theoretic guidance law 232 processing structure operates on the state estimate 236, $\hat{x}$, output by the TABF structure 234, to output the acceleration command 238, $u_1$, for the autopilot 160.

The TABF processing structure 234 may embodied as instructions executed by a general processor making the general processor function as a special processor or may be embodied as permanent instruction in an application specific integrated circuit or in any combination of the two, or other electrically equivalent means. The GTGL processing structure 232 may embodied as instructions executed by a general processor making the general processor function as a special processor or may be embodied as permanent instruction in an application specific integrated circuit or in any combination of the two. Accordingly, the TABF processing structure 234 and the GTGL processing structure 232, as instructions, may be executed by one or more processors within the TABF/GTGL processing unit 230. The TABF/GTGL processing unit 230 takes in measurements 242, in direct or derived form, or combinations thereof, from one or more sensors 140 and outputs acceleration commands 238 to the autopilot 160.

Figure 3:
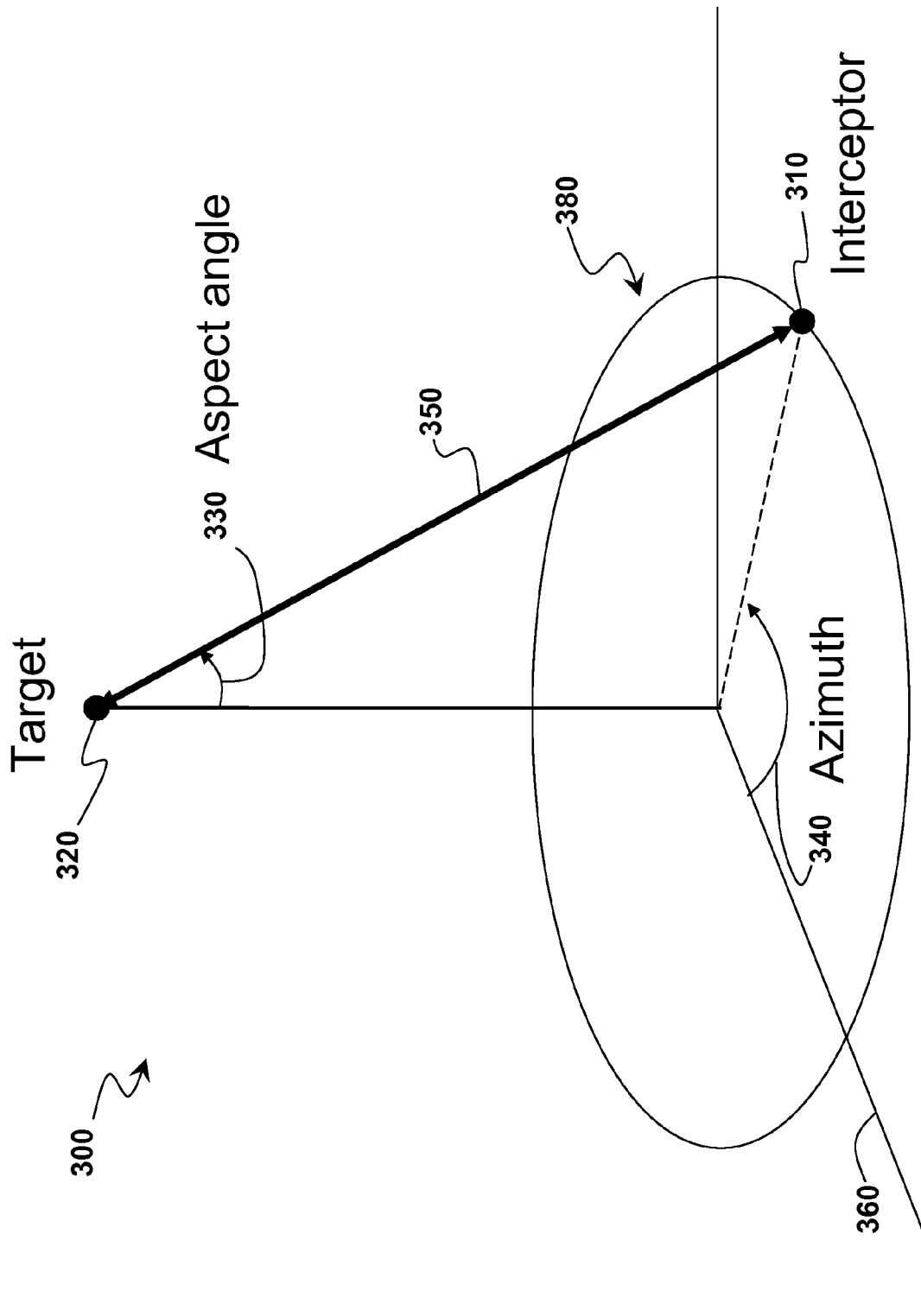
FIG. 3 is an illustration relating an exemplary interceptor position with an exemplary target position.
Figure 4:
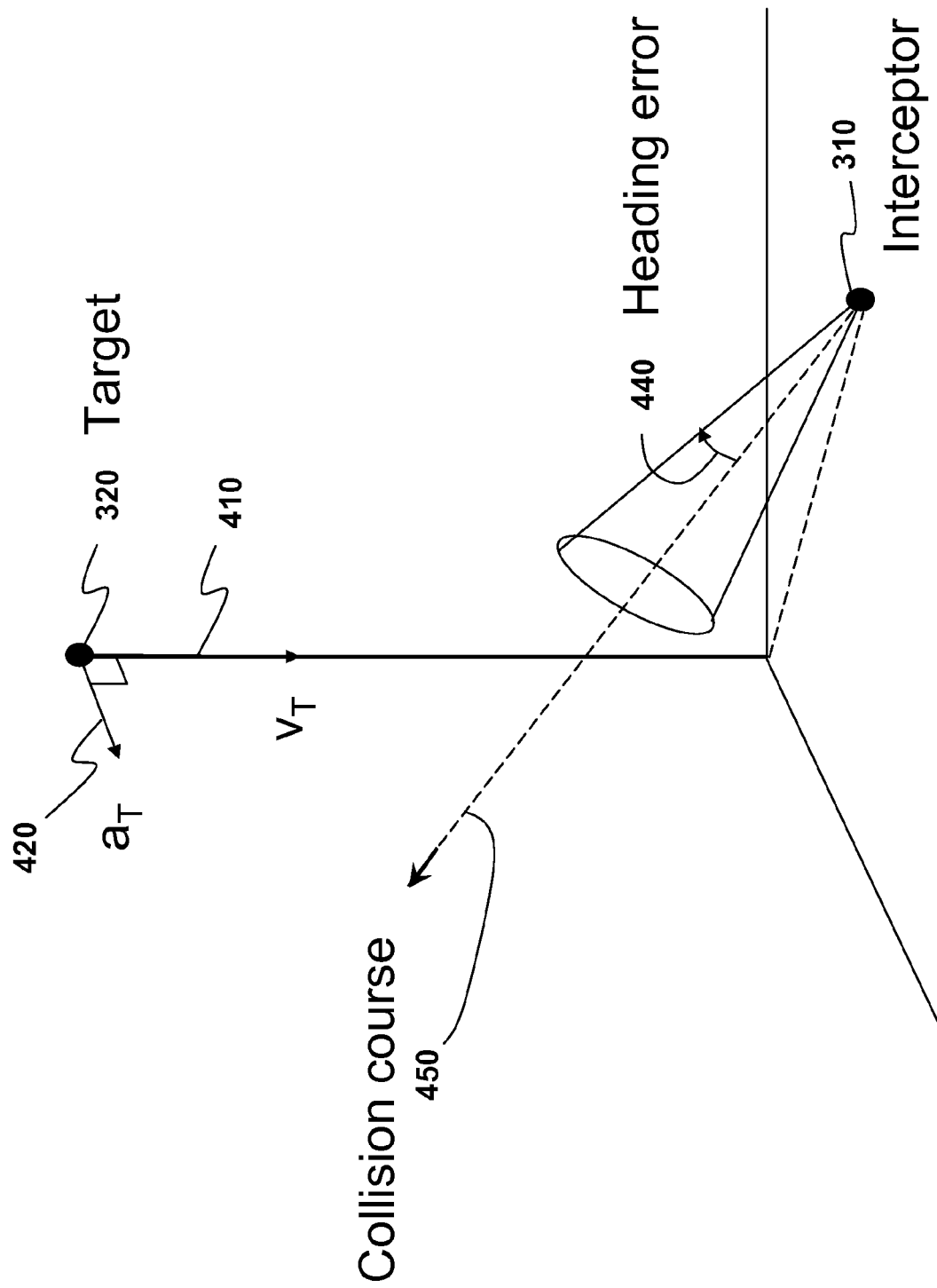
FIG. 4 is an illustration relating an exemplary interceptor velocity with an exemplary target velocity.
Figure 5:
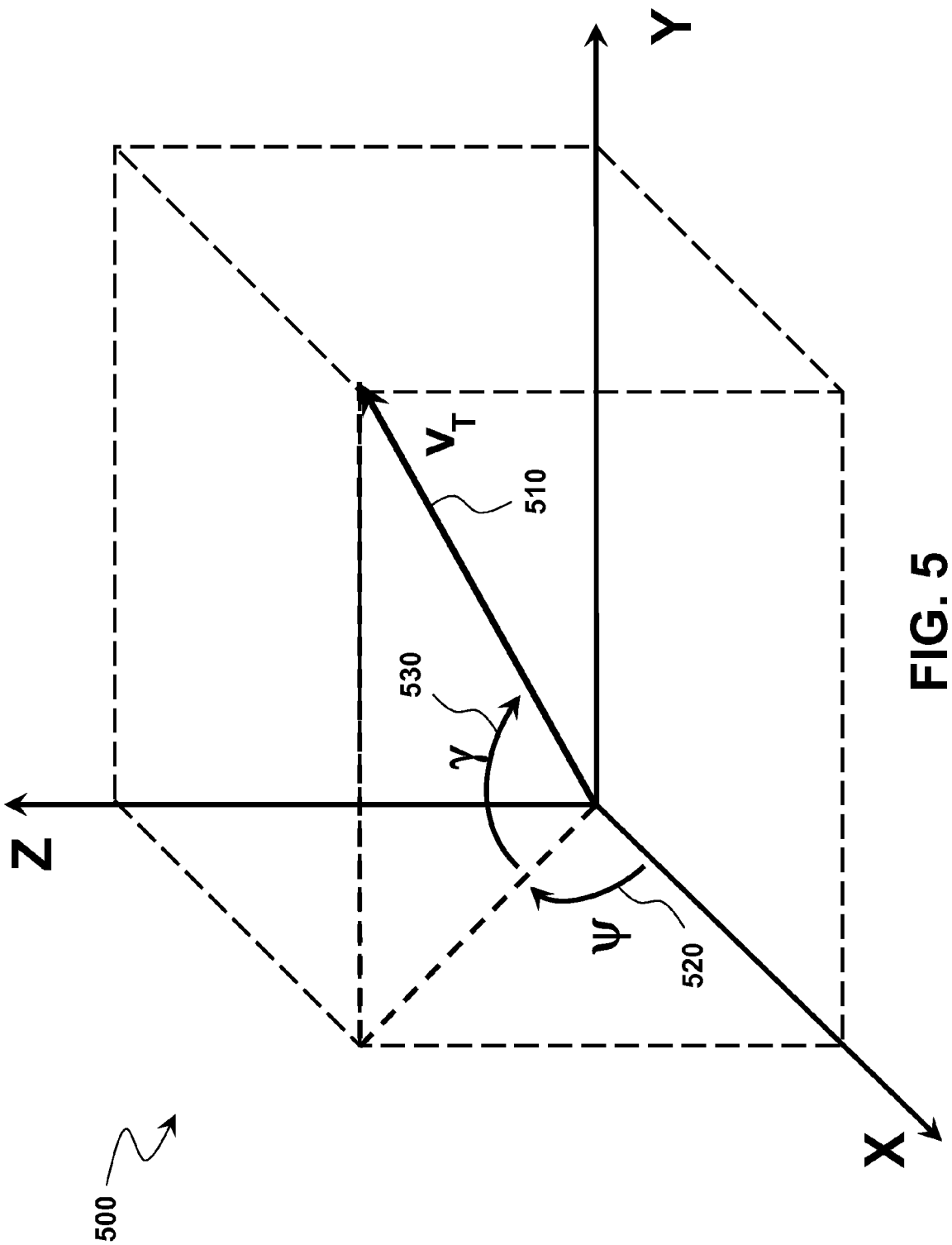
FIG. 5 is an illustration presenting an exemplary target velocity in an inertial coordinate frame.

As illustrated by example in FIG. 3, the intercept geometry 300 may be represented by relating the interceptor 310 and the target 320 where an aspect angle 330 may represent the angle between a reference axis 360 and the relative range vector 350, R, and where an azimuth angle 340 may represent the angle between a second reference axis 370, orthogonal to the first reference axis 360, and a projection of the relative range vector 350, R, onto the plane 370 orthogonal to the first reference axis 360. The target 320 may be represented in FIG. 4 as having a velocity vector 410, $v_T$, and an acceleration vector, itself having components represented as $a_T$ 420 orthogonal to the target velocity vector 410. The interceptor 310 may be represented as having, in a relative frame, a velocity vector that may have a heading error 440 when not aligned with the relative velocity vector projecting an intercept, i.e., the heading error 440 is a deviation from the collision course 450. Illustrated in FIG. 5 is an exemplary inertial frame 500 having three orthogonal axes where the target velocity 510, $v_T$, may be represented as a vector $\bar{v}_T$ and expressed in terms of its magnitude 510, $v_T$, flight path angle 530, $\gamma$, and heading angle 520, $\Psi$, where the heading angle 520, $\Psi$, is the angle of rotation from a first axis, e.g., the x-axis, to a projection of the target velocity vector onto the x-z plane, in this example, and where the flight path angle 530, $\gamma$, is the angle of rotation from the x-z plane projection to the target velocity vector $\bar{v}_T$.

Figure 6:
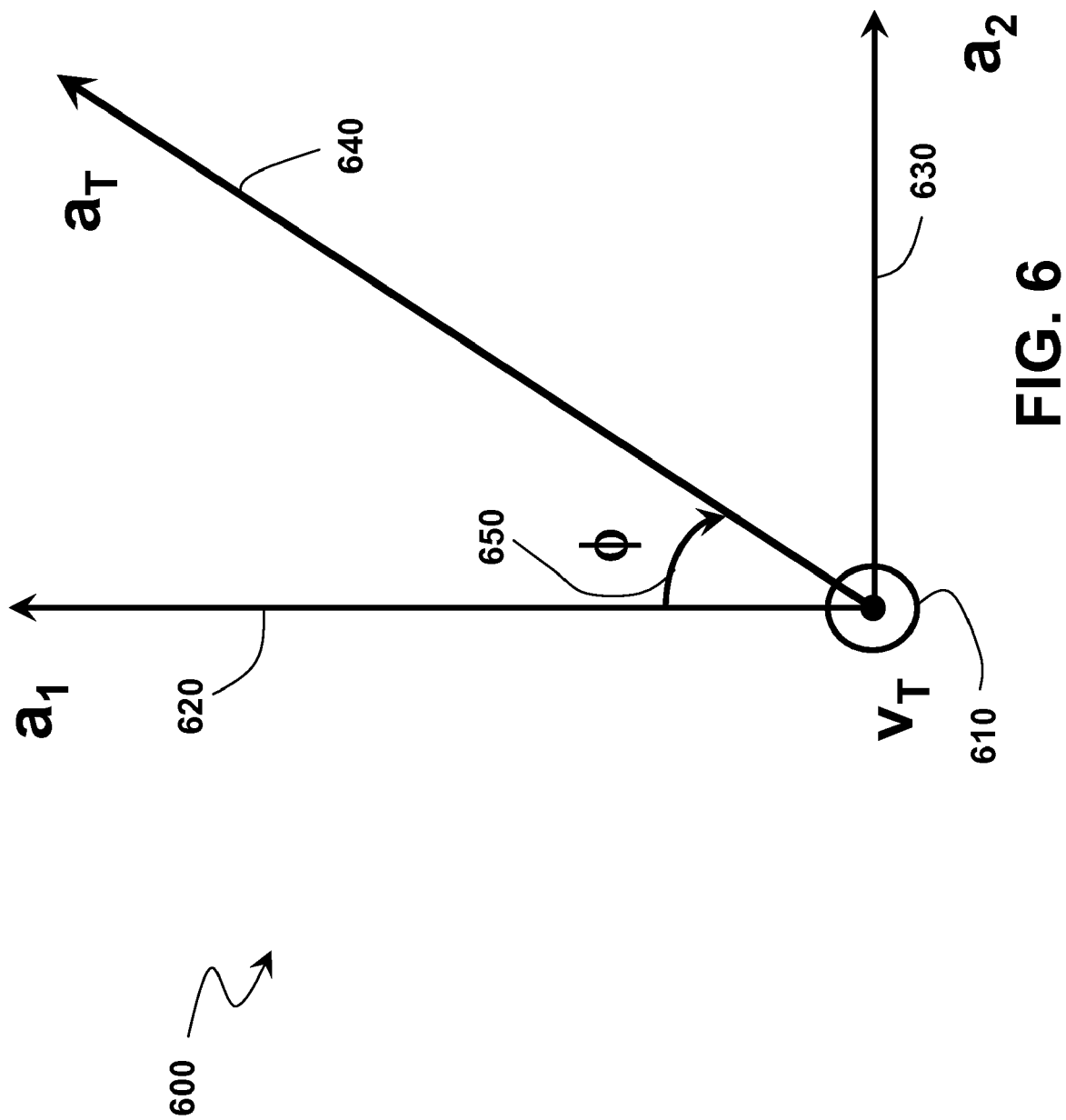
FIG. 6 is an illustration presenting a target acceleration orthogonal to the target velocity vector.

FIG. 6 illustrates a frame 600 in which the target acceleration 640, $\alpha_T$, orthogonal to the target velocity vector 610, $V_T$, may expressed in two orthogonal components, e.g., $\alpha_1$ 620 and $a_2$ 630 in a plane orthogonal to the velocity vector 610, $V_T$. The two orthogonal components may be related to the magnitude of the target acceleration 640, $a_T$, by the bank angle 650, $\phi$, where the bank angle 650 is the angular rotation from the axis of the target acceleration component $a_1$ to the target acceleration vector 640.

The second exemplary method and processing structure, the Target Acceleration Estimator/Linear Quadratic Guidance Law (TAE/LQGL), is derived based on a new target model where the target acceleration vector is assumed to be orthogonal to the target velocity vector and have constant magnitude and constant bank angle rate. This is based on the notion that the target acceleration vector diffuses on a sphere with unknown magnitude, which may be more rational than the usual Gauss-Markov stochastic target model. In addition to representing the actual target maneuvers better, this target model allows a system formulation that results in an implementable filter and guidance law. The extended Kalman filter is used to estimate the engagement states including the magnitude and bank angle of the target acceleration. Alternatively, the modified-gain extended Kalman filter may be used since it allows the measurements of the target in a spherical coordinate system to be processed almost linearly in a rectangular coordinate system. The guidance law is constructed by minimizing a quadratic performance index that includes the terminal miss distance and interceptor maneuverability subject to the assumed engagement dynamics. This guidance law is determined in closed form where the guidance gain is an explicit function of the estimated target acceleration and time-to-go. Furthermore, the LQ guidance law has an adaptive feature in that the guidance gain is adaptive to the target angular rate which is also estimated. Finally, the performance of this second method and processing structure, i.e., the TAE/LQGL, typically depends on whether the assumed target model represents the actual target maneuver as well as the lag in estimating the target acceleration. Note that the first method and processing structure, i.e., the TABF/GTGL, does not typically include estimation lag and may accommodate differing presumed target maneuvers.

Figure 7:
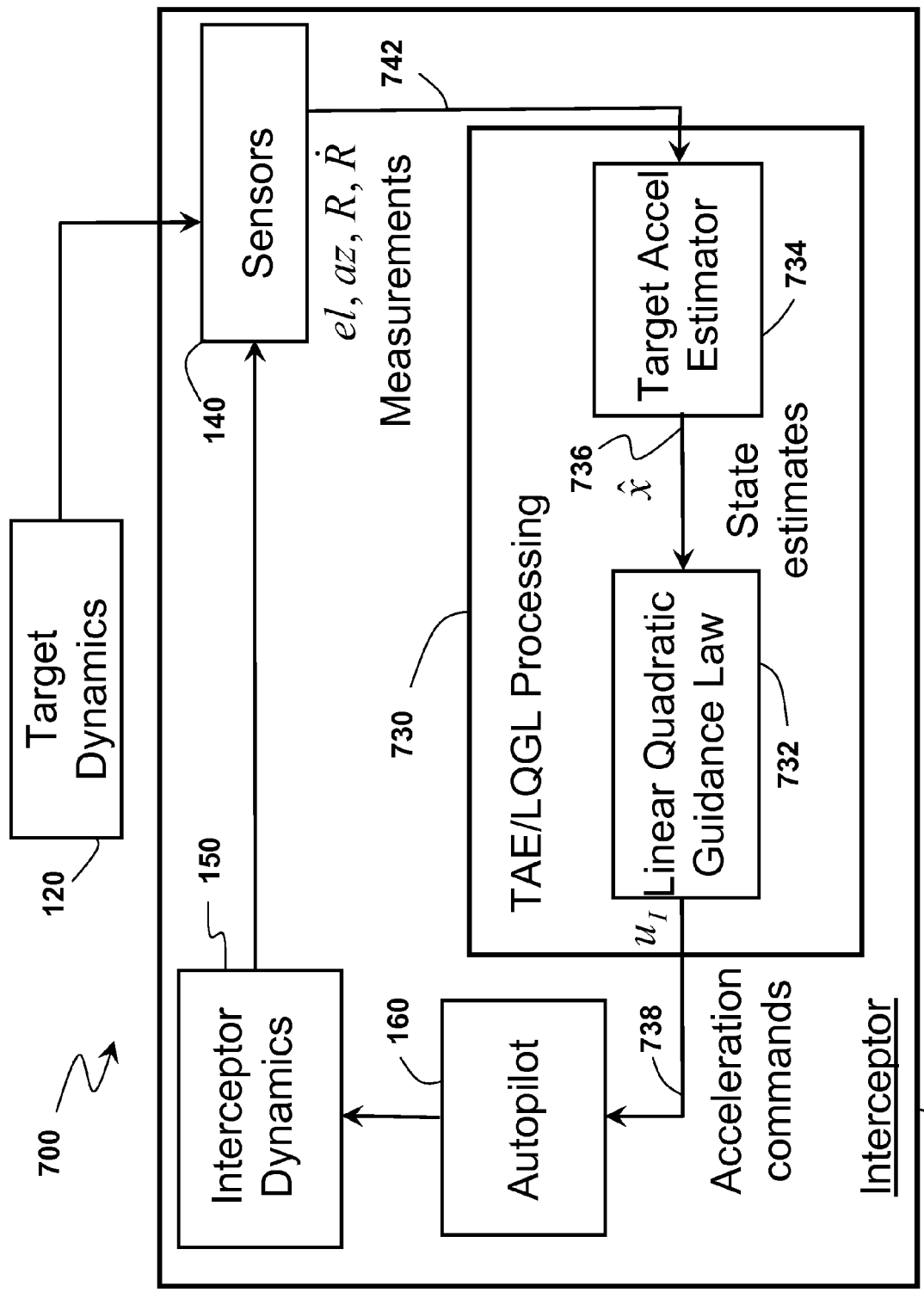
FIG. 7 is an exemplary top level functional block diagram of the Target Acceleration Estimator Linear Quadratic Guidance Law (TABF/LQGL) processing structure.

FIG. 7 illustrates in a top level block diagram 700 the TAE/LQGL processing 730 having a target acceleration estimator (or filter) 734 taking in measurements representative of the combined intercept dynamics of the target dynamics 120 and the interceptor dynamics 150, where the exemplary measurements 742 include and elevation angle, el, and azimuth angle, az, relative range, R, and relative range rate, $\dot{R}$. In addition, the interceptor velocity and acceleration may be provided as measurements. The one or more sensors 140 of the interceptor need not output the exemplary measurements 742, but instead output components, i.e., constituent elements, of the exemplary measurements 742, from which the exemplary measurements 742 may be formed or derived. The linear quadratic guidance law 732 processing structure operates on the state estimate 736, $\hat{x}$, output by the TAE filter structure 234, to output the acceleration command 738, $u_1$, for the autopilot 160.

The TAE processing structure 734 may embodied as instructions executed by a general processor making the general processor function as a special processor or may be embodied as permanent instruction in an application specific integrated circuit or in any combination of the two, or other electrically equivalent means. The LQGL processing structure 732 may embodied as instructions executed by a general processor making the general processor function as a special processor or may be embodied as permanent instruction in an application specific integrated circuit or in any combination of the two. Accordingly, the TAE processing structure 734 and the LQGL processing structure 732, as instructions, may be executed by one or more processors within the TAE/LQGL processing unit 730. The TAE/LQGL processing unit 730 takes in measurements 742, in direct or derived form, or combinations thereof, from one or more sensors 140 and outputs acceleration commands 738 to the autopilot 160.

Figure 8:
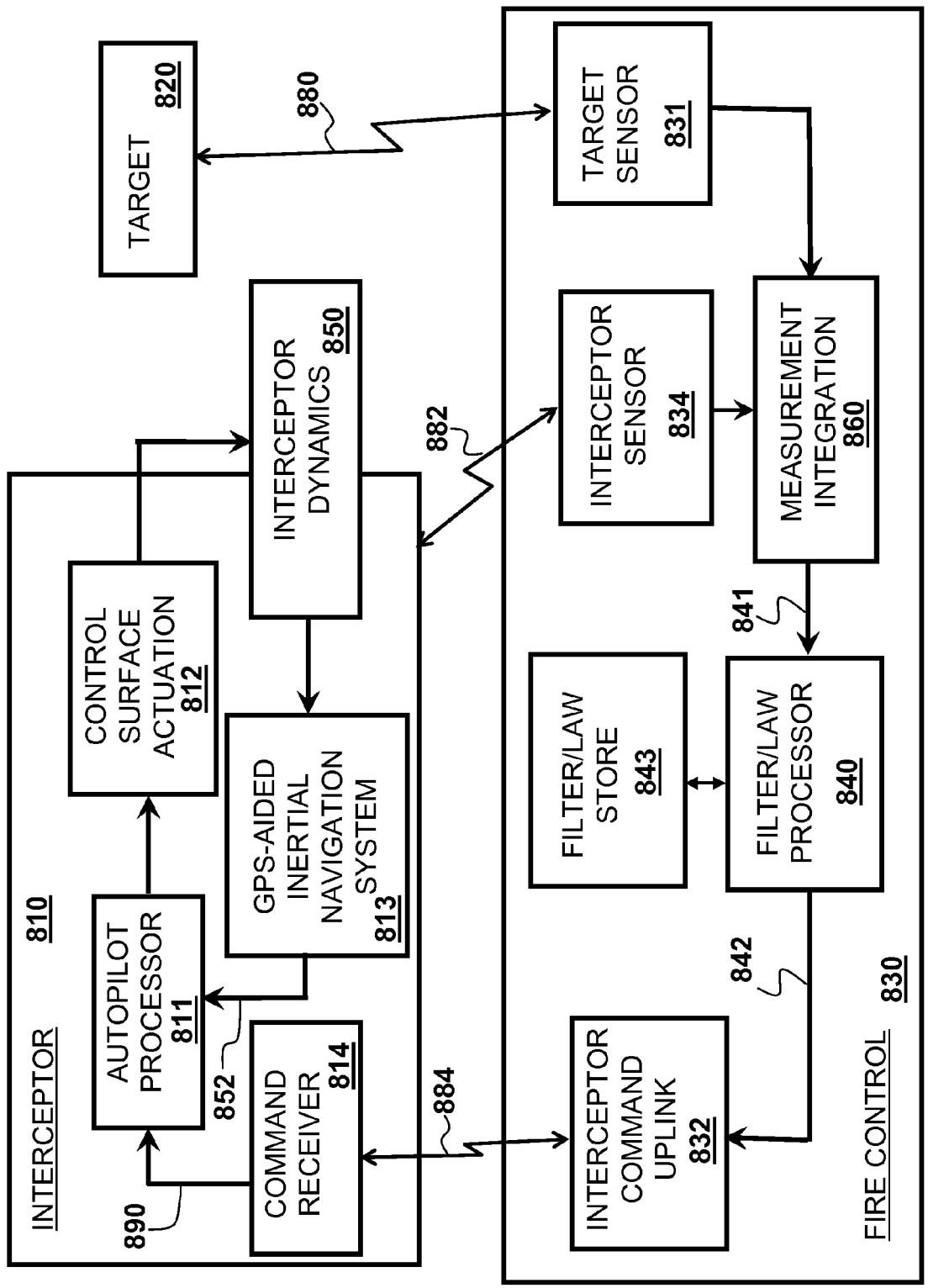
FIG. 8 is an exemplary functional block diagram of the filter and guidance law processing structure as part of a fire control of an interceptor.

The filter/law processing structures of the TABF/GTGL and TAE/LQGL and the execution of the processes of the TABF/GTGL and TAE/LQGL may be wholly within an interceptor, wholly external to the interceptor, or distributed between the interceptor and a target tracking system for example. That is, the filter/law processing structure may be modular and may be interposed between the integrated measurements and the autopilot whether part of a target tracking system such as a fire control system apart from the interceptor or part of the onboard processing of the interceptor itself. Illustrated in FIG. 8 is an exemplary system in functional block diagram form having a fire control 830, an interceptor 810 and a target 820 wherein the filter/law processing 840 is integrated into the fire control system 830. The target tracking system, a fire control system 830 in this example, includes a target sensor 831 for receiving electromagnetic waves 880 from the target wherein the target sensor 831 may passively sense the target via infrared emissions and/or optical or other radio frequency reflections from the target and the target sensor may actively transmit RF beams to the target. The exemplary fire control system 830 may also sense, via an interceptor sensor 834 or via the target sensor 831, electromagnetic waves 882 from the interceptor 810. Measurements from the target sensor 831 and interceptor sensor 834 may be integrated and/or placed into a reference frame and this may be done via processing steps in a measurement integration module 860. The measurement set 841, e.g., elevation, azimuth, relative range and relative range rate, may then be provided to the filter/law processing module 840. The interceptor velocity and interceptor acceleration may be derived from the interceptor sensor 834 or taken from the inertial measurement sensors or unit that may be integral to an inertial navigation system 813 that may be aided by a Global Positioning Satellite (GPS) receiver system. The interceptor velocity and interceptor acceleration taken from the inertial measurement sensors may be down-linked, typically via an encrypted RF or laser transmission to a downlink receiving system of the fire control 830 and thereafter provided, typically in decrypted form to the filter/law processing module 840. The filter/law processing module 840 may employ a filter/law data store 843, for example, the storing of guidance law gains as a function of anticipated remaining stages in the intercept scenario. Whether the filter law processing module processes the measurements according to the TABG/GTGL processing structure and methods or according to the TAE/LQGL processing structure and methods, the resulting acceleration command 842 may be provided to an interceptor command uplink 832 which may then transmit, typically via an encoded RF or laser link to a command receiver 814 onboard the interceptor 810. The onboard autopilot processing takes in the acceleration command 890, typically decoded by the command receiver 814, as well as measured interceptor dynamics 852 via inertial instruments such as those that may be integral to an inertial navigation system 813 that may be aided via GPS receiver processing. The autopilot generates commands to effectors such as controls surface actuators 812 or reaction control jets or trust vector control actuators. The interceptor dynamics functional block diagram 850 is shown straddling the interceptor 810 to indicate that while not part of the onboard instrumentation and processing, the interceptor dynamics 850 are integral to the intercept scenario.

Figure 9:
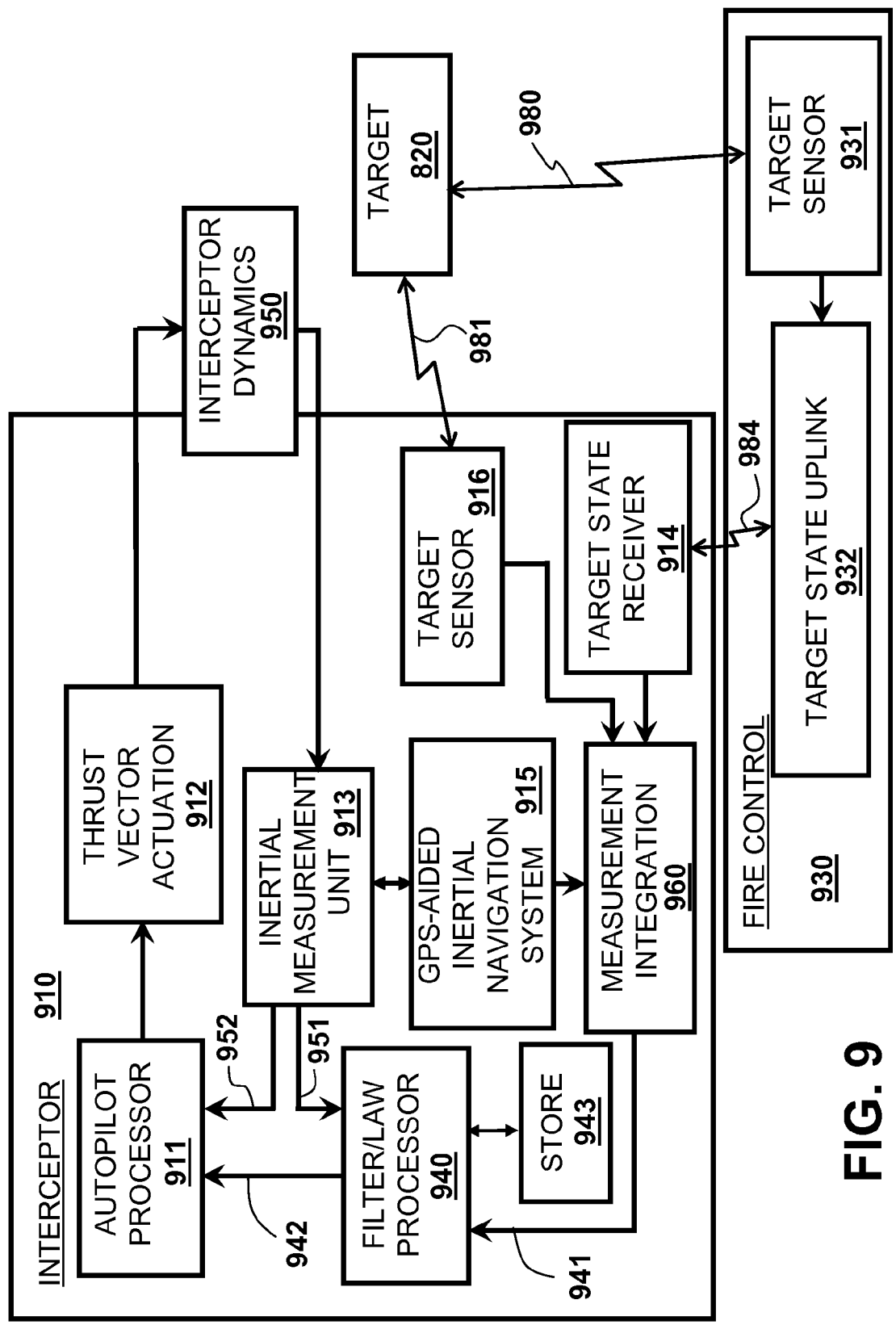
FIG. 9 is an exemplary functional block diagram of the filter and guidance law processing structure as part of the guidance, navigation and control system of an interceptor.

Illustrated in FIG. 9 is an exemplary system in functional block diagram form having a target tracking system such as an exemplary fire control 930, an interceptor 910 and a target 820 wherein the filter/law processing 940 is integrated into the interceptor 910. The target tracking system, a fire control system 930 in this example, includes a target sensor 931 for receiving electromagnetic waves 980 from the target wherein the target sensor 931 may passively sense the target via infrared emissions and/or optical or other radio frequency reflections from the target and the target sensor may actively transmit RF beams to the target. The exemplary fire control system 930 may transmit target trajectory information including target velocity and acceleration vectors to the interceptor 910 via a direct electrical linked (not shown) if connected and otherwise may transmit target information 984 via a target state uplink 932 to a target state receiver 914 onboard the interceptor 910. The interceptor may have a target sensor 916 may passively sense the target via infrared emissions and/or optical or other radio frequency reflections from the target and the target sensor may actively transmit RF beams to the target. Measurements from the target sensor 931, as may be encoded and uplinked via the target state uplink 932 and received and decoded via the target state receiver 914, and measurements from the interceptor's target sensor 916 may be integrated and/or placed into a reference frame and this may be done via processing steps in a measurement integration module 960 on board the interceptor 910. The measurement set 941, e.g., elevation angle, azimuth angle, relative range and relative range rate, may then be provided to the filter/law processing module 940. The measured velocity and acceleration 951 of the interceptor may be provided to the filter/law processing module 940 via the inertial measurement unit 913. The filter/law processing module 940 may employ a filter/law data store 943, for example, the storing of guidance law gains as a function of anticipated remaining stages in the intercept scenario. Whether the filter law processing module processes the measurements according to the TABG/GTGL processing structure and methods or according to the TAE/LQGL processing structure and methods, the resulting acceleration command 942 may be provided to the onboard autopilot processing 911. The autopilot processing 911 takes in the acceleration command 942, as well as measured interceptor dynamics 952 via inertial instruments such as an inertial measurement unit 913 that may be aided via GPS receiver processing 915. The autopilot generates commands to effectors such as trust vector control actuators 912, controls surface actuators or reaction control jets. The interceptor dynamics functional block diagram 950 is shown straddling the interceptor 910 to indicate that while not part of the onboard instrumentation and processing, the interceptor dynamics 950 are integral to the intercept scenario. An exemplary embodiment where the filter/law processor in onboard the interceptor is used in the simulated results summarized in Tables 1-4.

1.2 Process

Either of the two homing vehicle guidance and estimation processing structures may be described by a high level block diagram when applied against maneuvering targets. There are two major components described as comprising a processing structure and shown in FIG. 1, i.e., a filter that estimates the engagement states and a guidance law that guides the interceptor toward the target. The first exemplary processing structure includes a target acceleration blocking filter (TABF) and a game theoretic guidance law (GTGL). The second exemplary processing structure (TAE/LQGL) includes a target acceleration estimator (TAE) and a linear quadratic guidance law (LQGL).

The inputs to the exemplary process are any combinations of the bearing angles (for example a first bearing angle may be an elevation angle and a second bearing angle may be an azimuth angle), the range and the range rate (or closing velocity) between the target and interceptor measured in an inertia coordinate frame by either a target sensor such as a seeker on the interceptor or any other external sources. The filter combines the inputs through a specialized estimation structure. For the first filtering method and processing structure, the TABF is used. For the second filtering method and processing structure, the TAE is used. The outputs of the filter are typically the estimates of the engagement states. Then, the guidance law combines these state estimates through a specialized guidance structure. For the first guidance method and processing structure, the GTGL is used. For the second guidance method and processing structure, the LQGL is used. The output of the guidance law is typically the interceptor acceleration command which, when effected by the interceptor, will guide the interceptor toward the target. Accordingly, this interceptor acceleration command is the output of the exemplary process which is sent to the autopilot of the interceptor in order to generate the commanded interceptor acceleration.

1.3 Other Applications

While air vehicle interceptors and maneuvering air vehicle targets are employed as exemplary embodiments to teach the invention, the same processes and processing structures are applicable for any type of vehicle attempting to intercept another vehicle.

2. TABF/GTGL Method Processing and Processing Structure

For purposes of describing the TABF/GTGL processing, one may consider the three-dimensional relative dynamics between the target and interceptor in an inertial coordinate frame. States may be defined in the following set of equations as:

$$\dot{x}_r = u_r$$
$$\dot{y}_r = v_r$$
$$\dot{z}_r = \omega_r$$
$$\dot{u}_r = a_{1x} - a_{1x} \quad [1]$$
$$\dot{v}_r = a_{1y} - a_{1y}$$
$$\dot{\omega}_r = a_{Tz} - a_{1z}$$

where x, y, and z, represent components of the relative position vector, $u_r$, $v_r$ and $\omega_r$ represent components of the relative velocity vector, $a_{Tx}$, $a_{Ty}$, and $a_{Tz}$ represent components of the target acceleration vector and $a_{1x}$, $a_{1y}$, and $a_{1z}$ represent components of the interceptor acceleration vector. There are at least four possible measurements, where four are used in this example for the interceptor having one or more instruments that measure directly, or determines, the elevation angle, el, the azimuth angle, az, the range, R and the range rate, $\dot{R}$, between the target and interceptor and they be related in the following set of equations:

$$el = \sin^{-1} \frac{y_r}{\sqrt{x_r^2 + y_r^2 + z_r^2}} \quad [2]$$

$$az = \tan^{-1} \frac{z_r}{x_r}$$

$$R = \sqrt{x_r^2 + y_r^2 + z_r^2}$$

$$\dot{R} = \frac{x_r u_r + y_r v_r + z_r \omega_r}{\sqrt{x_r^2 + y_r^2 + z_r^2}}$$

Note that here the elevation angle is defined with respect to the xz-plane and the azimuth angle is defined in the xz-plane. However, these two angles can also be defined using the xy-plane or yz-plane. In addition, the interceptor has measurements of its own velocity, denoted as $v_{1x}$, $v_{1y}$ and $v_{1z}$, and acceleration, i.e., $a_{1x}$, $a_{1y}$ and $a_{1z}$.

An objective of the missile intercept problem is to determine the interceptor acceleration such that the terminal miss distance is minimized subject to the relative dynamics of the set of equation set 1 taking in all four measurements in the equation set 2 or any subset of the four measurements. This problem is solved by applying the solution of the linear-exponential-Gaussian (LEG) differential game or its limit, the linear-quadratic-Gaussian (LQG) differential game. In Section 2.1, the system dynamics supporting the TABF/GTGL processing structure are described. In Section 2.2, exemplary solutions of the LEG and LQG differential games are described. In Section 2.3, the generalizations for applying the solutions of the LEG and LQG differential games to the air vehicle, particularly missile target, intercept problem are described. In Section 2.4, the TABF/GTGL processing structure is summarized. In Section 2.5, an illustrative numerical example is provided.

2.1 System Dynamics
State and control variables may be represented as follows:

$$x = \begin{bmatrix} x_r \\ y_r \\ z_r \\ u_r \\ v_r \\ \omega_r \end{bmatrix}, u_T = \begin{bmatrix} a_{Tx} \\ a_{Ty} \\ a_{Tz} \end{bmatrix}, u_I = \begin{bmatrix} a_{Ix} \\ a_{Iy} \\ a_{Iz} \end{bmatrix} \quad [3]$$

Then, equation set 1 with the addition of process noise $\omega$ can be written as $$\dot{x} = Ax + B_1 u_T + B_1 u_I + \omega \quad [4]$$

where $$A = \begin{bmatrix} 0 & 0 & 0 & 1 & 0 & 0 \\ 0 & 0 & 0 & 0 & 1 & 0 \\ 0 & 0 & 0 & 0 & 0 & 1 \\ 0 & 0 & 0 & 0 & 0 & 0 \\ 0 & 0 & 0 & 0 & 0 & 0 \\ 0 & 0 & 0 & 0 & 0 & 0 \end{bmatrix}, B_T = \begin{bmatrix} 0 & 0 & 0 \\ 0 & 0 & 0 \\ 0 & 0 & 0 \\ 1 & 0 & 0 \\ 0 & 1 & 0 \\ 0 & 0 & 1 \end{bmatrix}, B_I = \begin{bmatrix} 0 & 0 & 0 \\ 0 & 0 & 0 \\ 0 & 0 & 0 \\ -1 & 0 & 0 \\ 0 & -1 & 0 \\ 0 & 0 & -1 \end{bmatrix} \quad [5]$$

Continuous time dynamics may be represented by the propagations of finite time increments, or discrete time intervals, via a discretization of the continuous time dynamics. By discretizing equation 4, the discrete-time relative dynamics may be represented as:

$$x_{i+1} = \Phi x_i + \Gamma_T u_{T,i} + \Gamma_I u_{I,i} + \omega_i \quad [6]$$

where $$\Phi = I + A\Delta t \quad [7]$$

$$\Gamma_T = \left(I + \frac{A\Delta t}{2}\right) B_T \Delta t$$

$$\Gamma_I = \left(I + \frac{A\Delta t}{2}\right) B_I \Delta t$$

and where $\Delta t$ is the sampling time. From the system of equation 2, the measurement equation with the addition of sensor noise $v_i$ can be written as $$z_i = h(x_i) + v_i \quad [8]$$

where $z_i$ may include four measurements, i.e., two angles, range and range rate, or an subset of the four measurements. It is assumed for these exemplary embodiments that $\omega_i$ and $u_i$ are zero mean, white Gaussian process with variance W and V, respectively. In addition, it assumed for these exemplary embodiments that the interceptor has measurements of its own velocity, i.e., $v_{1x}$, $v_{1y}$, and $v_{1z}$, and acceleration, i.e., $a_{1x}$, $a_{1y}$ and $a_{1z}$, available to its processing.

2.2 Solutions of LEG and LQG Differential Games
The LEG differential game may be expressed as:

$$\min_{u_I} \max_{u_T} E[e^{-\gamma S}] \quad [9]$$

where $$S = \frac{1}{2}\|x_N\|_{Q_N}^2 + \sum_{i=0}^{N-1} \frac{1}{2}\left(\|u_{I,i}\|_{R_I}^2 + |u_{T,i}\|_{R_T}^2\right)$$ [10]

subject to $$x_{i+1} = \Phi x_i + \Gamma_T u_{T,i} + \Gamma_1 u_{1,i} + \omega_i$$

$$z_i = H_i x_i + v_i$$ [11]

where N is the number of stages known a priori, $y \geq 0$, $Q_N \geq 0$, $R_1 > 0$ and $R_T < 0$ are design parameters. As $\gamma \to 0$, the LEG differential game becomes the LQG differential game. The solution of the LEG differential game, as a processing structure, includes a filter and a guidance law. The filter includes the time propagation and measurement update steps. The time propagation of the state and covariance may be represented as:

$$\bar{x}_{i+1} = \Phi \hat{x}_i + \Gamma u_{1,i}$$

$$\bar{P}_{i+1} = \Phi P_i \Phi^T + W - \Gamma_T (\gamma R_T)^{-1} \Gamma_T^T$$ [12]

where $\bar{x}$ is the a prior state estimate, $\hat{x}$ is the a posteriori state estimate, $\bar{P}$ is the a prior error covariance and P is the a posteriori error covariance. The measurement update may be processed as $$\hat{x}_i = \bar{x}_i + K(z_i - H_i \bar{x}_i)$$

$$P_i = (I - K_i H_i)\bar{P}(I - K_i H_i)^T + K_i V K_i^T$$ [13]

And where the filter gain may be processed as $$K_i = \bar{P}_i H_i^T (H^i \bar{P}_i H_i^T + V)^{-1}.$$ [14]

Since this filter cannot be evaluated in the limit where $\gamma \to 0$, the time propagation and measurement update are rewritten in terms of $\bar{P}^{-1}$ instead of $\bar{P}$. The time propagation may be rewritten and processed as:

$$\bar{x}_{i+1} = \Phi \hat{x}_i + \Gamma_1 u_{1,i}$$

$$\bar{P}_{i+1}^{-1} = N_i^{-1} - N_i^{-1} \Phi (P_i^{-1} + \Phi^T N_i^{-1} \Phi) \Phi^T N_i^{-1}$$ [15]

$$N_i^{-1} = W^{-1} - W^{-1} \Gamma_T (\Gamma_T^T W^{-1} \Gamma_T - \gamma R_T)^{-1} \Gamma_T^T W^{-1}$$

or $$\bar{x}_{x+1} = \Phi \hat{x}_i + \Gamma_1 u_{1,i}$$

$$\bar{P}_{i+1}^{-1} = N_i^{31\,1} - N_i^{-1} \Gamma_T (\Gamma_T^T N_i^{-1} \Gamma_T - \gamma R_T)^{-1} \Gamma_T^T N_i^{-1}$$ [16]

$$N_i^{-1} = (\Phi P_1 \Phi^T + W)^{-1}$$

The measurement update may be reformulated and processed as $$\hat{x}_i = \bar{x} + P_i H_i^T V^{-1}(z_i - H_i \bar{x}_i)$$

$$P_i = (\bar{P}_i^{-1} + H_i^T V^{-1} H_i)^{-1}$$ [17]

As previously described, in the limit, i.e., when $\gamma \to 0$, the LEG differential game becomes the LQG differential game. Therefore, the time propagation for the LQG differential game may be processed as:

$$\bar{x}_{i+1} = \Phi \hat{x}_i + \Gamma_1 u_{1,i}$$

$$\bar{P}_{i+1}^{-1} = N_i^{-1} - N_i^{-1} \Phi (P_i^{-1} + \Phi^T N_i^{-1} \Phi) \Phi^T N_i^{-1}$$ [18]

$$N_i^{-1} = W^{-1} - W^{-1} \Gamma_T (\Gamma_T^T W^{-1} \Gamma_T)^{-1} \Gamma_T^T W^{-1}$$

or $$\bar{x}_{i+1} = \Phi \hat{x}_i + \Gamma_1 u_{1,i}$$

$$\bar{P}_{i+1}^{-1} = N_i^{-1} - N_i^{-1} \Gamma_T (\Gamma_T^T N_i^{-1} \Gamma_T)^{-1} \Gamma_T^T N_i^{-1}$$ [19]

$$N_i^{-1} = (\Phi P_i \Phi^T + W)^{-1}$$

The measurement update for the LQG differential game may be processed as $$\hat{x}_i = \bar{x}_i + P_i H_i^T V^{-1}(z_i - H_i \bar{x}_i)$$

$$P_i = (\bar{P}_i^{-1} + H_i^T V^{-1} H_i)^{-1}$$ [20]

For both LEG and LQG differential games, the guidance law may be expressed as:

$$u_{1,i} = G_i \hat{x}_i;$$ [21]

where the guidance gain may be expressed as:

$$G_i = -R_1^{-1} \Gamma_1^T \Pi_{i+1} (I + \Gamma_1 R_1^{-1} \Gamma_1^T \Pi_{i+1} + \Gamma_T R_T^{-1} \Gamma_T^T \Pi_{i+1})^{-1} \Phi;$$ [22]

and where $$\Pi_i = \Phi^T \Pi_{i+1} (I + \Gamma_1 R_1^{-1} \Gamma_1^T \Pi_{i+1} + \Gamma_T R_T^{-1} \Gamma_T^T \Pi_{i+1})^{-1} \Phi,$$
$$\Pi_N = Q_N$$ [23]

2.3 Generalization for the Missile Intercept Problem

In order to apply the solutions of the LEG AND LQG differential games to the missile intercept problem, three generalizations are required. First, the LEG and LQG differential games assume that the number of stages is fixed and known a priori while the number of stages is unknown in the missile intercept problem. Therefore, a generalization may be made to determine the number of remaining stages to be used in the guidance law. Since the time-to-go may be approximated by $$T_{go} = \frac{R}{\dot{R}} = \frac{x_r^2 + y_r^2 + z_r^2}{x_r u_r + y_r v_r + z_r \omega_r}$$ [24]

where $x_r$, $y_r$, $z_r$, $u_r$, $v_r$, and $\omega_r$ are estimated as $\hat{x}_i$, the number of remaining stages can be estimated online by dividing the estimated times-to-go by the sampling time $\Delta t$ and rounding to the nearest integer.

Second, the LEG and LQG differential games typically apply linear measurements while the measurements of equation 8 used in the missile intercept problem are nonlinear. Therefore, a generalization may be required to modify the filter to a structure similar to that of an extended Kalman filter. While the time propagation remains the same, the measurement update for both LEG and LQG differential games in the exemplary scenario becomes $$\hat{x} = \bar{x}_i + K_i[z_i - h(\bar{x}_i)]$$

$$P_i = (I - K_i H_i)\bar{P}_i(I - K_i H_i)^T + K_i V K_i^T$$ [25]

$$K_i = \bar{P}_i H_i^T (H_i \bar{P}_i H_i^T + V)^{-1}$$

or $$\hat{x}_i = \bar{x}_i + P_i H_i^T V^{-1}[z_i - h(\bar{x}_i)]$$ [26]

$$P_i = (\bar{P}_i^{-1} + H_i^T V^{-1} H_i)^{-1}$$

where $$H_i = \frac{\partial h}{\partial x_i}\bigg|_{x_i = \hat{x}_i} \quad \text{and} \quad [27]$$

$$\frac{\partial el}{\partial x_i} = \left[ \frac{-x_r y_r}{(x_r^2 + y_r^2 + z_r^2)(x_r^2 + z_r^2)^{0.5}} \frac{(x_r^2 + z_r^2)^{0.5}}{x_r^2 + y_r^2 + z_r^2} \cdots \frac{-y_r z_r}{(x_r^2 + y_r^2 + z_r^2)(x_r^2 + z_r^2)^{0.5}} 000 \right] \quad [28]$$

$$\frac{\partial az}{\partial x_i} = \left[ \frac{-z_r}{x_r^2 + z_r^2} 0 \frac{x_r}{x_r^2 + z_r^2} 000 \right]$$

$$\frac{\partial R}{\partial x_i} = \left[ \frac{x_r}{(x_r^2 + y_r^2 + z_r^2)^{0.5}} \frac{y_r}{(x_r^2 + y_r^2 + z_r^2)^{0.5}} \frac{z_r}{(x_r^2 + y_r^2 + z_r^2)^{0.5}} 000 \right]$$

$$\frac{\partial \dot{R}}{\partial x_i} = \left[ \frac{u_r(y_r^2 + z_r^2) - x_r(y_r v_r + z_r \omega_r)}{(x_r^2 + y_r^2 + z_r^2)^{1.5}} \frac{v_r(x_r^2 + z_r^2) - y_r(x_r u_r + z_r \omega_r)}{(x_r^2 + y_r^2 + z_r^2)^{1.5}} \cdots \right.$$

$$\left. \frac{\omega_r(x_r^2 + y_r^2) - z_r(x_r u_r + y_r v_r)}{(x_r^2 + y_r^2 + z_r^2)^{1.5}} \frac{x_r}{(x_r^2 + y_r^2 + z_r^2)^{0.5}} \frac{y_r}{(x_r^2 + y_r^2 + z_r^2)^{0.5}} \cdots \frac{z_r}{(x_r^2 + y_r^2 + z_r^2)^{0.5}} \right]$$

Third, the LEG and LQG differential games typically consider a three-dimensional direction $\Gamma_T$ for the target acceleration while the missile intercept problem may use a two-dimensional direction that is orthogonal to the target velocity vector. Since the target acceleration vector may be expressed as being orthogonal to the target velocity vector, $$a_{Tx}v_{Tx} + a_{Ty}v_{Ty} + a_{Tz}v_{Tz} = 0 \quad [29]$$

where $v_{Tx}$, $v_{Ty}$ and $v_{Tz}$ are the target velocity. Then, $$a_{Tz} = -v_{Tx}v_{Tz}^{-1}a_{Tx} - v_{Ty}v_{Tz}^{-1}a_{Ty} \quad [30]$$

and $$B_T u_T = \begin{bmatrix} 0 & 0 & 0 \\ 0 & 0 & 0 \\ 0 & 0 & 0 \\ 1 & 0 & 0 \\ 0 & 1 & 0 \\ 0 & 0 & 1 \end{bmatrix} \begin{bmatrix} a_{Tx} \\ a_{Ty} \\ a_{Tz} \end{bmatrix} = \begin{bmatrix} 0 & 0 \\ 0 & 0 \\ 0 & 0 \\ v_{Tz} & 0 \\ 0 & v_{Tz} \\ -v_{Tx} & -v_{Ty} \end{bmatrix} \begin{bmatrix} v_{Tz}^{-1} a_{Tx} \\ v_{Tz}^{-1} a_{Ty} \end{bmatrix} \quad [31]$$

Now the new two-dimensional target acceleration direction can be estimated as $$\Gamma_T = \begin{bmatrix} 0 & 0 \\ 0 & 0 \\ 0 & 0 \\ \omega_r + v_{Iz} & 0 \\ 0 & \omega_r + v_{Iz} \\ -(u_r + v_{Ix}) & -(v_r + v_{Iy}) \end{bmatrix} \quad [32]$$

where $u_r$, $v_r$ and $\omega_r$ are estimated as part of $\hat{x}_i$ and $u_{Ix}$, $u_{Iy}$ and $u_{Iz}$ are measured and known by the interceptor. Therefore, the target acceleration direction $\Gamma_T$ can be estimated online, i.e., by the processing structure typically in real time, as two-dimensional and time-varying instead of three-dimensional, time-invariant and a priori known. This new target acceleration direction will be used in the time propagation of the filter while the measurement update of the filter does not require the use of target acceleration direction. Furthermore, because this new target acceleration direction is not known a priori, in the revised processing structure, it is not incorporated into the structure of the exemplary guidance law.

2.4 Summary of Generating a Filter/Law Processing Structure

The structuring and implementation procedures of the TABF/GTGL processing structure shown in FIG. 2 are summarized below.

2.4.1 Structuring Procedure

The structuring procedure for the GTGL may be as follows:

1. Define a sampling time, $\Delta t$, which may be derived from a trade of computational requirements and acceptable propagation error.
2. Generate discrete-time dynamics, i.e., $\Phi$, $\Gamma_T$ and $\Gamma_1$.
3. Choose an arbitrarily large value for N that is sufficient in value to accommodate the total iterations or stages, expected in the execution of an intercept.
4. Determine structure parameters $R_1$, $R_T$ and $Q_N$ experimentally, that is, to choose these parameters according to the acceleration capability of the interceptor, the expected acceleration capability of the target and the desired terminal miss distance, and to tune these parameters in numerical simulation.
5. Calculate guidance gain as in equation 22 and store it as a table as a function of the number of the remaining stages.

The structuring procedure for the TABF may be as follows:

1. Define a sampling time, $\Delta t$, which may be derived from a trade of computational requirements and acceptable propagation error.
2. Generate discrete-time dynamics, i.e., $\Phi$ and $\Gamma_1$.
3. Configure the structure to take in at least one of four measurements from two angles, range and range rate.
4. Determine structural parameters W, V, $\gamma$ and $R_T$ experimentally, that is, to choose these parameters according to the measurement uncertainty and system disturbances, and to tune these parameters in numerical simulation.
5. Determine an initial $\overline{P}$ experimentally from the observed state uncertainties and to account for particular dynamical uncertainties as process noise.

Note that $R_T$ for the filter is different from the $R_T$ for the guidance law because the $\Gamma_T$ for the filter is two-dimensional, time-varying and estimated online while the $\Gamma_T$ for the guidance law is three-dimensional, time-invariant and known a priori. Also note that the filter gain may be determined online, that is, by the executing of the processing structure, because of the linearization of h around $\bar{x}$ and the estimation of $\Gamma_T$ by using $\hat{x}$.

2.4.2 Implementation Procedure

At every sampling time, the following steps may be performed:
1. Acquire the input of the TABF/GTGL processing structure from the sensors chosen in the design procedure and the sensors that measure the interceptor's own velocity and acceleration.
2. Perform filter measurement update.
   Determine a linearized measurement matrix as in equation 27 by using the a priori state estimate.
   Determine the a posteriori state estimate and the a posteriori error covariance as in equation 25 or equation 26 by using the a priori state estimate, the a priori error covariance and the acquired measurements.
3. Generate interceptor acceleration command.
   Determine a time-to-go estimate as in equation 24 by using the a posteriori state estimate.
   Determine the number of remaining stages by applying the estimated time-to-go value.
   Obtain guidance gain through table lookup by using the number of remaining stages.
   Determine interceptor acceleration command as in equation 21 by applying the guidance gain and the a posteriori state estimate.
4. Send interceptor acceleration command as the output of the TABF/GTGL processing structure to the autopilot of the interceptor to generate interceptor acceleration, e.g., by re-orienting the interceptor to create a change in the angle-of-attack of the interceptor that produces the commanded interceptor acceleration.
5. Perform filter time propagation.
   Determine $\Gamma_T$ as in equation 32 by using the a posteriori state estimate and interceptor velocity measurement.
   Determine the a priori state estimate and the a priori error covariance by using the a posteriori state estimate, the a posteriori error covariance and interceptor acceleration measurement as in equation 12, equation 15, or equation 16, if the LEG differential game solution is used or equation 18 or equation 19 if the LQG differential game solution is used.

2.5 Numerical Example

In this section, a numerical example is given to demonstrate the performance of the TABF/GTGL method and processing structure. This example simulates a ballistic air vehicle target in an intercept scenario as shown in FIG. 3 and FIG. 4. The initial distance between the target and interceptor is 50 km. The initial aspect angle is 0, 15 or 30 deg. The initial azimuth is 0, 45, 90, 135, 180, 225, 270 or 315 deg. The initial target velocity is 3 km/s pointing toward the ground. The initial interceptor velocity is 2 km/s with the initial heading angle being 0, 5 or 10 deg off from the collision course associated with a non-maneuvering target. The target acceleration vector is orthogonal to the target velocity vector. There are three different target acceleration vectors starting at range-to-go of 20 km. All three target acceleration factors have a magnitude of 7 g, i.e., seven time the acceleration of gravity, while one does not rotate in the plane that is orthogonal to the target velocity vector and the other two rotate at 0.1 and 2 Hz, respectively. The magnitude of the interceptor acceleration vector is limited to be below 20 g and has a lag in its response to changes in acceleration command represented in this example as a first-order filter with time constant of 0.1 sec. There are three different measurement sets. The first set only has angle measurement. The second set has angle and range measurements. The third set has angle, range and range rate measurements. The measurements are updated at 100 Hz. There are two levels of sensor noise in this example. The larger sensor noise has standard deviation of 0.001 rad for the angle measurement, 1 m for the range measurement and 1 m/s for the range rate measurement. The smaller sensor noise has standard deviation of 0.0001 rad for the angle measurement, 0.1 m for the range measurement and 0.1 m/s for the range rate measurement.

The exemplary TABF/GTGL processing is structured for the three measurement sets with two levels of sensor noise and evaluated under the three target accelerations using Monte-Carlo analysis. For each case, 100 simulation runs are conducted and 90% of the data are used to calculate the averaged miss distance. The averaged miss distance of the algorithm when the larger sensor noise is used is summarized in Table 1. The averaged miss distance of the algorithm when the smaller sensor noise is used is summarized in Table 2. In both Tables 1 and 2, the first, second and third rows represent the three cases where the target acceleration does not rotate, rotates at 0.1 Hz and rotates at 2 Hz, respectively. The first, second and third columns represent the three cases where different measurement sets are used. These statistical miss distance results show that the TABF/GTGL processing structure has hit-to-kill capability for all three target accelerations under the ballistic missile intercept scenario.

TABLE 1

Simulated averaged miss distance for interceptor having lower quality sensor modeled.

| | Measurement | | |
|---|---|---|---|
| Target maneuver | Angles | Angles & Range | Angles, Range & Range Rate |
| No rotation | 1.3501 m | 1.2858 m | 0.7182 m |
| Rotate at 0.1 Hz | 1.3769 m | 1.3091 m | 0.7822 m |
| Rotate at 2 Hz | 0.6653 m | 0.6254 m | 0.4630 m |

TABLE 2

Simulated averaged miss distance for interceptor having higher quality sensor modeled.

| | Measurement | | |
|---|---|---|---|
| Target maneuver | Angles | Angles & Range | Angles, Range & Range Rate |
| No rotation | 0.0940 m | 0.0851 m | 0.0581 m |
| Rotate at 0.1 Hz | 0.0944 m | 0.0894 m | 0.0591 m |
| Rotate at 2 Hz | 0.1007 m | 0.0929 m | 0.0628 m |

3. TAE/LQGL Method and Processing Structure

The following describes the three-dimensional relative dynamics between the target and interceptor in an inertial coordinate frame:

$$\dot{x}_r = u_r \quad [33.1]$$

$$\dot{y}_r = v_r \quad [33.2]$$

$$\dot{z}_r = \omega_r \quad [33.3]$$

$$\dot{u}_r = a_{1x} - \bar{a}_{1x} \quad [33.4]$$

$$\dot{u}_r = a_{1x} - \bar{a}_{1y} \quad [33.5]$$

$$\dot{\omega}_r = a_{1z} - \bar{a}_{1z} \quad [33.6]$$

$$\dot{\bar{a}}_{1x} = -a\bar{a}_{1x} + aa_{1x} \quad [33.7]$$

$$\dot{\bar{a}}_{1y} = -a\bar{a}_{1y} + aa_{1y} \quad [33.8]$$

$$\dot{\bar{a}}_{1z} = -a\bar{a}_{1z} + aa_{1z} \quad [33.9]$$

where $x_r$, $y_r$ and $z_r$ are the relative position, $u_r$, $v_r$ and $\omega_r$ are the relative velocity, $a_{tx}$, $a_{ty}$ and $a_{tz}$ are the target acceleration, $\bar{a}_{1x}$, $\bar{a}_{1y}$ and $\bar{a}_{1z}$ are the interceptor acceleration, $a_{1x}$, $a_{1y}$ and $a_{1z}$ are the interceptor acceleration command and $a^{-1}$ is the known time constant of the interceptor's actuator lag. There are four possible measurement for the interceptor that measure the elevation angle el, azimuth angle az, range R and range rate $\dot{R}$ between the target and interceptor, and they may be represented as follows:

$$z_{el} = \sin^{-1} \frac{y_r}{\sqrt{x_r^2 + y_r^2 + z_r^2}} + \upsilon_{el} \quad [34]$$

$$z_{az} = \tan^{-1} \frac{z_r}{x_r} + \upsilon_{az}$$

$$z_R = \sqrt{x_r^2 + y_r^2 + z_r^2} + \upsilon_R$$

$$z_{\dot{R}} = \frac{x_r u_r + y_r v_r + z_r \omega_r}{\sqrt{x_r^2 + y_r^2 + z_r^2}} + \upsilon_{\dot{R}}$$

where $v_{el}$, $v_{az}$, $v_R$ and $v_{\dot{R}}$ are zero mean, white Gaussian processes with variances $V_{el}$, $V_{az}$, $V_R$ and $V_{\dot{R}}$, respectively, representing the measurement uncertainty. Note that here the elevation angle is defined with respect to the xz-plane and the azimuth angle is defined in the xz-plane. However, these two angles can also be defined using xy-plane or yz-plane. In addition, the interceptor has measurements of its own velocity, denoted as $u_{1x}$, $u_{1y}$ and $u_{1z}$, and acceleration. i.e., $\bar{a}_{1x}$, $\bar{a}_{1y}$ and $\bar{a}_{1z}$.

The objective of the missile intercept problem is typically to determine the interceptor acceleration command, or an equivalent, such that the terminal miss distance is minimized subject to the relative dynamics of equations 33.1-33.9 given all four measurements in the set of equations 34 or any subset of the four measurements. This problem may be solved by using a target acceleration estimator (TAE) and a linear quadratic guidance law (LQGL). It may be assumed in the present exemplary solution that the target acceleration vector s orthogonal to the target velocity vector. Furthermore, it may be assumed that the magnitude and bank angle rate of the target acceleration vector are constant. The TAE estimates the magnitude and bank angle of the target acceleration vector based on a target model and the LQGL is designed by minimizing a quadratic performance index that includes terminal miss distance and interceptor maneuverability subject to the assumed engagement dynamics.

3.1 Target Model

In this section, the target model, or a representation of the target's dynamical characteristics, is developed based on the exemplary assumptions that the target acceleration vector s orthogonal to the target velocity vector and the magnitude and bank angle rate of the target acceleration vector are constant. First, the target velocity vector $\bar{v}_T$ is expressed in terms of its magnitude $v_T$, flight path angle $\gamma$ and heading angle $\Psi$ as $$\bar{v}_T = v_T \cos \gamma \cos \Phi \bar{i} + v_T \sin \gamma \bar{j} + v_T \cos \gamma \sin \Psi \bar{k} \quad [35]$$

where $\bar{i}$, $\bar{j}$ and $\bar{k}$ are the unit vectors along the three axis of an inertial coordinate frame as in FIG. 5. In order to define the plane for the target acceleration vector $\bar{a}_T$ that is orthogonal to the target velocity vector, two unit vectors are needed. One vector can be obtained by rotating the unit vector along $\bar{v}_T$ by 90 degrees in $\gamma$ as $$\bar{a}_1 = -\sin \gamma \cos \Psi \bar{i} + \cos \gamma \bar{j} - \sin \gamma \sin \Psi \bar{k}. \quad [36]$$

The other vector can be obtained as $$\bar{a}_2 = \bar{a}_1 \times \bar{u}_T = \sin \Psi \bar{i} - \cos \Psi \bar{k}. \quad [37]$$

Therefore, $\bar{a}_T$ can be expressed as $$\bar{a}_T = a_T \cos \phi \bar{a}_1 + a_t \sin \phi \bar{a}_2, \quad [38]$$

where $a_T$ and $\phi$ are the magnitude and bank angle of the target acceleration vector, respectively, as shown in FIG. 6.

By substituting equation 36 and equation 37 into equation 38, $$\bar{a}_T = (-a_T \cos \phi \sin \gamma \cos \Psi + a_T \sin \phi \sin \Psi) \bar{i} + a_T \cos \phi \cos \gamma \bar{j} + (-a_T \cos \phi \sin \gamma \sin \Psi - a_T \sin \phi \cos \Psi) \bar{k} \quad [39]$$

By using Brownian motion processes $\omega_\gamma$ and $\omega_\psi$ to represent the uncertainty in the orthogonality between the target acceleration and velocity vectors, equation 39 becomes $$\bar{a}_T = [-a_T \cos \phi \sin(\gamma+\omega_\gamma) \cos(\Psi+\omega_\psi) + a_T \sin \phi \sin(\Psi+\omega_\psi)]\bar{i} + a_T \cos \phi \cos(\gamma+\omega_\gamma)\bar{j} + [-a_T \cos \phi \sin(\gamma+\omega_\gamma)\sin(\psi+\omega_\psi) - a_T \sin \phi \cos(\psi+\omega_\psi)]\bar{k} \quad [40]$$

By defining the target states as:

$a_1 = a_T \sin \phi \sin(\gamma+\omega_\gamma) \sin(\psi+\omega_\psi)$ $a_2 = a_T \sin \phi \sin(\gamma+\omega_\gamma) \cos(\psi+\omega_\psi)$ $a_3 = a_T \sin \phi \cos(\gamma+\omega_\gamma) \sin(\psi+\omega_\psi)$ $a_4 = a_T \sin \phi \cos(\gamma+\omega_\gamma) \cos(\psi+\omega_\psi)$ $a_5 = a_T \cos \phi \sin(\gamma+\omega_\gamma) \sin(\psi+\omega_\psi)$ $a_6 = a_T \cos \phi \sin(\gamma+\omega_\gamma) \cos(\psi+\omega_\psi)$ $a_7 = a_T \cos \phi \cos(\gamma+\omega_\gamma) \sin(\psi+\omega_\psi)$ $a_8 = a_T \cos \phi \cos(\gamma+\omega_\gamma) \cos(\psi+\omega_\psi)$ $a_9 = a_T \sin \phi \sin(\gamma+\omega_\gamma)$ $a_{10} = a_T \sin \phi \cos(\gamma+\omega_\gamma)$ $a_{11} = a_T \cos \phi \sin(\gamma+\omega_\gamma)$ $a_{12} = a_T \cos \phi \cos(\gamma+\omega_\gamma)$ $a_{13} = a_T \sin \phi \sin(\psi+\omega_\psi)$ $a_{14} = a_T \sin \phi \cos(\psi+\omega_\psi)$ $a_{15} = a_T \cos \phi \sin(\psi+\omega_\psi) \quad [41]$ $a_{16} = a_T \cos \phi \cos(\psi+\omega_\psi)$ then, equation 40 becomes $$\bar{a}_T = (-a_6 + a_{13})\bar{i} + a_{12}\bar{j} + (-a_5 - a_{14})\bar{k} \quad [42]$$

and accordingly $$a_{1x} = -a_6 + a_{13} \quad [43]$$

$a_{1y} = a_{12}$ $a_{1z} = -a_5 - a_{14}$ may be used to express the target acceleration vector components.

By taking the Ito stochastic differential of the system of equation 41, the target model is obtained as orthogonality between the target acceleration and velocity vectors. Also, there are ten additional pseudo-measurements formed because of the trigonometry on the target states.

$$\begin{bmatrix} \dot{a}_1 \\ \dot{a}_2 \\ \dot{a}_3 \\ \dot{a}_4 \\ \dot{a}_5 \\ \dot{a}_6 \\ \dot{a}_7 \\ \dot{a}_8 \end{bmatrix} = \begin{bmatrix} -\frac{\Omega_\gamma+\Omega_\psi}{2} & \dot{\psi} & \dot{\gamma} & 0 & \dot{\phi} & \cdots & 0 & 0 & 0 \\ -\dot{\psi} & -\frac{\Omega_\gamma+\Omega_\psi}{2} & 0 & \dot{\gamma} & 0 & \cdots & \dot{\phi} & 0 & 0 \\ -\dot{\gamma} & 0 & -\frac{\Omega_\gamma+\Omega_\psi}{2} & \dot{\psi} & 0 & \cdots & 0 & \dot{\phi} & 0 \\ 0 & -\dot{\gamma} & -\dot{\psi} & -\frac{\Omega_\gamma+\Omega_\psi}{2} & 0 & \cdots & 0 & 0 & \dot{\phi} \\ -\dot{\phi} & 0 & 0 & 0 & -\frac{\Omega_\gamma+\Omega_\psi}{2} & \cdots & \dot{\psi} & \dot{\gamma} & 0 \\ 0 & -\dot{\phi} & 0 & 0 & -\dot{\psi} & \cdots & -\frac{\Omega_\gamma+\Omega_\psi}{2} & 0 & \dot{\gamma} \\ 0 & 0 & -\dot{\phi} & 0 & -\dot{\gamma} & \cdots & 0 & -\frac{\Omega_\gamma+\Omega_\psi}{2} & \dot{\psi} \\ 0 & 0 & 0 & -\dot{\phi} & 0 & \cdots & -\dot{\gamma} & -\dot{\psi} & -\frac{\Omega_\gamma+\Omega_\psi}{2} \end{bmatrix} \begin{bmatrix} a_1 \\ a_2 \\ a_3 \\ a_4 \\ a_5 \\ a_6 \\ a_7 \\ a_9 \end{bmatrix} + \begin{bmatrix} a_3 & a_2 \\ a_4 & -a_1 \\ -a_1 & a_4 \\ -a_2 & -a_3 \\ a_7 & a_6 \\ a_8 & -a_5 \\ -a_5 & a_8 \\ -a_6 & -a_7 \end{bmatrix} \begin{bmatrix} \omega_\gamma \\ \omega_\psi \end{bmatrix} \quad [44.1]$$

$$\begin{bmatrix} \dot{a}_9 \\ \dot{a}_{10} \\ \dot{a}_{11} \\ \dot{a}_{12} \end{bmatrix} = \begin{bmatrix} -\frac{\Omega_\gamma}{2} & \dot{\gamma} & \dot{\phi} & 0 \\ -\dot{\gamma} & -\frac{\Omega_\gamma}{2} & 0 & \dot{\phi} \\ -\dot{\phi} & 0 & -\frac{\Omega_\gamma}{2} & \dot{\gamma} \\ 0 & -\dot{\phi} & -\dot{\gamma} & -\frac{\Omega_\gamma}{2} \end{bmatrix} \begin{bmatrix} a_9 \\ a_{10} \\ a_{11} \\ a_{12} \end{bmatrix} + \begin{bmatrix} a_{10} \\ -a_9 \\ a_{12} \\ -a_{11} \end{bmatrix} \omega_\gamma \quad [44.2]$$

$$\begin{bmatrix} \dot{a}_{13} \\ \dot{a}_{14} \\ \dot{a}_{15} \\ \dot{a}_{16} \end{bmatrix} = \begin{bmatrix} -\frac{\Omega_\psi}{2} & \dot{\psi} & \dot{\phi} & 0 \\ -\dot{\psi} & -\frac{\Omega_\psi}{2} & 0 & \dot{\phi} \\ -\dot{\phi} & 0 & -\frac{\Omega_\psi}{2} & \dot{\psi} \\ 0 & -\dot{\phi} & -\dot{\psi} & -\frac{\Omega_\psi}{2} \end{bmatrix} \begin{bmatrix} a_{13} \\ a_{14} \\ a_{15} \\ a_{16} \end{bmatrix} + \begin{bmatrix} a_{14} \\ -a_{13} \\ a_{16} \\ -a_{15} \end{bmatrix} \omega_\psi \quad [44.3]$$

with $$\ddot{\phi} = \omega_\phi \quad [44.4]$$

and where $\omega_\gamma$ and $\omega_\psi$ are zero mean, white Gaussian processes with power spectral densities $\Omega_\gamma$ and $\Omega_\psi$, respectively, and $\omega_\phi$ is a zero mean, white Gaussian process with power spectral density $\Omega_\phi$ representing the uncertainty in the constant bank angle rate. By taking the derivative of equation 35 and comparing to equation 39, the time derivative of the flight path angle and heading angle, i.e., the target angular velocity, may be expressed as:

$$\dot{\gamma} = \frac{a_T \cos\phi}{v_T} \quad [45]$$

$$\dot{\psi} = \frac{a_T \sin\phi}{v_T \cos\gamma}$$

Finally, there is a pseudo-measurement formed based on the orthogonality between the target velocity and acceleration vectors.

$$z_{p1} = a_{Tx}(u_r + v_{1x}) + a_{Ty}(v_r + v_{Ty}) + a_{Tz}(\omega_r + v_{Iz}) + v_{p1} \quad [46]$$

where $v_{p1}$ is a zero mean, white Gaussian process with variance $V_{p1}$ representing the uncertainty in the $$z_{p2} = a_1^2 + a_2^2 - a_9^2 + u_{p2}$$

$$z_{p3} = a_3^2 + a_4^2 - a_{10}^2 + u_{p3}$$

$$z_{p4} = a_5^2 + a_6^2 - a_{11}^2 + u_{p4}$$

$$z_{p5} = a_7^2 + a_8^2 - a_{12}^2 + u_{p5}$$

$$z_{p6} = a_1^2 + a_3^2 - a_{13}^2 + u_{p6}$$

$$z_{p7} = a_2^2 + a_4^2 - a_{14}^2 + u_{p7}$$

$$z_{p8} = a_5^2 + a_7^2 - a_{15}^2 + u_{p8}$$

$$z_{p9} = a_6^2 + a_8^2 - a_{16}^2 + u_{p9}$$

$$z_{p10} = a_9^2 + a_{10}^2 - a_{13}^2 - a_{14}^2 + u_{p10}$$

$$z_{p11} = a_{11}^2 + a_{12}^2 - a_{15}^2 - a_{16}^2 + u_{p11} \quad [47]$$

where $v_{p2}$, $v_{p3}$ ... $v_{p11}$ are zero mean, white, Gaussian processes with variances $V_{p2}$, $V_{p3}$ ... $V_{p11}$, respectively, representing the uncertainty in the target states. When these pseudo-measurements are implemented, they are also set to zero.

3.2 Target Acceleration Estimator

In this section, the TAE is developed by using the extended Kalman filter to estimate the engagement states based on equation 33.1 to equation 33.6 and equation 44. By assuming the interceptor has measurements of its own acceleration (i.e., $\bar{a}_{1x}$, $\bar{a}_{1y}$, and $\bar{a}_{1z}$.), equation 33.7 to equation 33.9 are not needed in the filter design. The states x, inputs u, state-dependent process noise $\omega$, non-state-dependent process noise $\tilde{w}$, measurements z and sensor noise u may be represented with the following set of equations:

$$x = [x_r\, y_r\, z_r\, u_r\, u_r\, \omega_r\, a_1\, a_2 \ldots a_{16}\, \phi]^T$$

$$u = [\bar{a}_{1x}\, \bar{a}_{1y}\, \bar{a}_{1z}]^T$$

$$\omega = [\omega_\gamma\, \omega_\psi]^T$$

$$\tilde{\omega} = \omega_\phi \quad [48]$$

$$z = [z_{el}\, z_{az}\, z_R\, z_{\dot{R}}\, z_{p1}\, z_{p2} \ldots z_{p11}]^T$$

$$v = [v_{el}\, v_{az}\, v_R\, v_{\dot{R}}\, v_{p1}\, v_{p2} \ldots v_{p11}]^T$$

Accordingly, the system dynamics and measurement equation for the filter design can be written $$\dot{x} = f(x) + Bu + G(x)\omega + \tilde{G}\tilde{\omega} \quad [49]$$

as $$z = h(x) + v$$

where f(x) may be represented by equations 33.1 to equation 33.6 and equation 44, and h(x) may be represented by equation 34, equation 46 and equation 47.

Since the system dynamics and measurement equation are nonlinear, the extended Kalman filter, which includes a time propagation step and a measurement update step, may be used to estimate the states. The a priori state estimate may be represented as $\bar{x}(t|t_{i-1})$ and the a priori error covariance may be denoted as $\bar{P}(t|t_{i-1})$ where $t_{i-1} \leq t \leq t_i$. The a posteriori state estimate may be denoted as $\hat{x}(t_i)$ and a posteriori error covariance may be denoted as $P(t_i)$. The state covariance $E[x(t)x(t)^T]$ may be represented as $X(t)$ because of the state-dependent process noise. For the time propagation, $\bar{x}(t|t_{i-1})$ and $\bar{P}(t|t_{i-1})$ are propagated from the current time $t_{i-1}$ to the next sample time $t_i$ by integrating $$\dot{\bar{x}}(t|t_{i-1}) = f[\bar{x}(t|t_{i-1})] + Bu(t)$$

$$\dot{\bar{P}}(t|t_{i-1}) = A(t)\bar{P}(t|t_{i-1})A(t)^T + E\{G[x(t)]\Omega G[x(t)]^T\} + \tilde{G}\tilde{\Omega}\tilde{G}^T \quad [50]$$

with the initial condition $\bar{x}(t_{i-1}|t_{i-1}) = \hat{x}(t_{i-1})$ and $\bar{P}(t_{i-1}|t_{i-1}) = P(t_{i-1})$ where $$A(t) = \left.\frac{\partial f}{\partial x}\right|_{x=\bar{x}(t|t_{i-1})} \quad [51]$$

The term due to the state-dependent process noise $E\{G[x(t)]\Omega G[x(t)]^T\}$ may be determined by integrating $$\dot{X}(t) = A(t)X(t) + X(t)A(t)^T + E\{G[x(t)]\Omega G[x(t)]^T\} + \tilde{G}\tilde{\Omega}\tilde{G}^T \quad [52]$$

where $$\Omega = \begin{bmatrix} \Omega_\gamma & 0 \\ 0 & \Omega_\psi \end{bmatrix} \quad [53]$$

$$\tilde{\Omega} = \Omega_\phi$$

For the measurement update, $\hat{x}(t_i)$ and $P(t_i)$ may be updated by applying the set of equations:

$$\hat{x}(t_i) = \bar{x}(t_i|t_{i-1}) + K(t_i)\{z(t_i) - h[\bar{x}(t_i|t_{i-1})]\}$$

$$P(t_i) = [I - K(t_i)H(t_i)]\bar{P}(t_i|t_{i-1})[I - K(t_i)H(t_i)]^T + K(t_i)VK(t_i)^T \quad [54]$$

where the filter gain may be updated according to the following representation:

$$K(t_i) = \bar{P}(t_i|t_{i-1})H(t_i)^t[H(t_i)\bar{P}(t_i|t_{i-1})H(t_i)^T + V]^{-1} \quad [55]$$

and the linearized measurement matrix may be represented and updated according to the following $$H(t_i) = \left.\frac{\partial h}{\partial x}\right|_{x=\bar{x}(t|t_{i-1})} \quad [56]$$

and V is a diagonal matrix with $V_{el}$, $V_{az}$, $V_R$, $V_{\dot{R}}$ and $V_{p1}$, $V_{p2} \ldots V_{p11}$ on the diagonal line.

3.3 Linear Quadratic Guidance Law

In this section, the LQGL structure is explained by a solution to a deterministic linear quadratic optimization problem. For the derivation of the guidance law, it may be assumed that the target angular velocity $\gamma$ and $\psi$ are constant. The optimization problem for determining the guidance law may be expressed as:

$$\min_{a_{lx}, a_{ly}, a_{lz}} \frac{1}{2}[x_r(t_f)^2 + y_r(t_f)^2 + z_r(t_f)^2] + \quad [57]$$

$$\frac{c}{2}\int_t^{t_f} [a_{lx}(\tau)^2 + a_{ly}(\tau)^2 + a_{lz}(\tau)^2]d\tau$$

subject to equation 33 and equation 44.1 to equation 44.3 without the noise $\omega_\gamma$ and $\omega_\psi$ where c is a design parameter, t is the current time and $t_f$ is the final time. The optimal solutions for the intercept acceleration command $a^*_{1x}$, $a^*_{1y}$ and $a^*_{1z}$ are $$a^*_{lx}(t) = -\frac{2}{\alpha}(1 - \alpha T_{go} - e^{-\alpha T_{go}})\left(2c + \frac{2T_{go}^3}{3} - \frac{2T_{go}^2}{\alpha} + \frac{2T_{go}}{\alpha^2} + \frac{1}{\alpha^3} - \frac{4T_{go}e^{-\alpha T_{go}}}{\alpha^2} - \frac{e^{-2\alpha T_{go}}}{\alpha^3}\right)^{-1} \quad [58.1]$$

$$\left\{x_r(t) + T_{go}u_r(t) + \frac{1}{\alpha^2}(1 - \alpha T_{go} - e^{-\alpha T_{go}})\bar{a}_{lx}(t) - [0\ 0\ 0\ 0\ 0\ -1\ 0\ 0][\Phi^{(2)}_{\gamma\psi\phi}(t) + T_{go}\Phi^{(1)}_{\gamma\psi\phi}(t)]\right.$$

$$\Phi_{\gamma\psi\phi}(T_{go})[a_1(t)\ a_2(t)\ a_3(t)\ a_4(t)\ a_5(t)\ a_6(t)\ a_7(t)\ a_8(t)]^T -$$

-continued $$[1 \ 0 \ 0 \ 0][\Phi_{\psi\phi}^{(2)}(t) + T_{go}\Phi_{\psi\phi}^{(1)}(t)]\Phi_{\psi\phi}(T_{go})[a_{13}(t) \ a_{14}(t) \ a_{15}(t) \ a_{16}(t)]^T\}$$

$$a_{Iy}^*(t) = -\frac{2}{\alpha}(1 - \alpha T_{go} - e^{-\alpha T_{go}})\left(2c + \frac{2T_{go}^3}{3} - \frac{2T_{go}^2}{\alpha} + \frac{2T_{go}}{\alpha^2} + \frac{1}{\alpha^3} - \frac{4T_{go}e^{-\alpha T_{go}}}{\alpha^2} - \frac{e^{-2\alpha T_{go}}}{\alpha^3}\right)^{-1} \quad [58.2]$$

$$\{y_r(t) + T_{go}v_r(t) +$$

$$\frac{1}{\alpha^2}(1 - \alpha T_{go} - e^{-\alpha T_{go}})\overline{a}_{Iy}(t) - [0 \ 0 \ 0 \ 1][\Phi_{\gamma\phi}^{(2)}(t) + T_{go}\Phi_{\gamma\phi}^{(1)}(t)]\Phi_{\gamma\phi}(T_{go})[a_9(t) \ a_{10}(t) \ a_{11}(t) \ a_{12}(t)]^T\}$$

$$a_{Iz}^*(t) = -\frac{2}{\alpha}(1 - \alpha T_{go} - e^{-\alpha T_{go}})\left(2c + \frac{2T_{go}^3}{3} - \frac{2T_{go}^2}{\alpha} + \frac{2T_{go}}{\alpha^2} + \frac{1}{\alpha^3} - \frac{4T_{go}e^{-\alpha T_{go}}}{\alpha^2} - \frac{e^{-2\alpha T_{go}}}{\alpha^3}\right)^{-1} \quad [58.3]$$

$$\{z_r(t) + T_{go}\omega_r(t) + \frac{1}{\alpha^2}(1 - \alpha T_{go} - e^{-\alpha T_{go}})\overline{a}_{Iz}(t) - [0 \ 0 \ 0 \ 0 \ -1 \ 0 \ 0 \ 0][\Phi_{\gamma\psi\phi}^{(2)}(t) + T_{go}\Phi_{\gamma\psi\phi}^{(1)}(t)]$$

$$\Phi_{\gamma\psi\phi}(T_{go})[a_1(t) \ a_2(t) \ a_3(t) \ a_4(t) \ a_5(t) \ a_6(t) \ a_7(t) \ a_8(t)]^T - [0 \ -1 \ 0 \ 0][\Phi_{\psi\phi}^{(2)}(t) + T_{go}\Phi_{\psi\phi}^{(1)}(t)]$$

$$\Phi_{\psi\phi}(T_{go})[a_{13}(t) \ a_{14}(t) \ a_{15}(t) \ a_{16}(t)]^T\}$$

$\Phi_{\gamma\psi\phi}$, $\Phi_{\gamma\phi}$ and $\Phi_{\psi\phi}$ are defined as $$\Phi_{\gamma\psi\phi}(\tau) = \quad [59]$$

$$\frac{1}{4}e^{-\frac{(\Omega_\gamma + \Omega_\psi)\tau}{2}}\begin{bmatrix} \Phi_{\gamma\psi\phi 1}(\tau) & \Phi_{\gamma\psi\phi 2}(\tau) & \Phi_{\gamma\psi\phi 3}(\tau) & \Phi_{\gamma\psi\phi 4}(\tau) & \ldots & \Phi_{\gamma\psi\phi 5}(\tau) & \Phi_{\gamma\psi\phi 6}(\tau) & \Phi_{\gamma\psi\phi 7}(\tau) & \Phi_{\gamma\psi\phi 8}(\tau) \\ -\Phi_{\gamma\psi\phi 2}(\tau) & \Phi_{\gamma\psi\phi 1}(\tau) & -\Phi_{\gamma\psi\phi 4}(\tau) & \Phi_{\gamma\psi\phi 3}(\tau) & \ldots & -\Phi_{\gamma\psi\phi 6}(\tau) & \Phi_{\gamma\psi\phi 5}(\tau) & -\Phi_{\gamma\psi\phi 8}(\tau) & \Phi_{\gamma\psi\phi 7}(\tau) \\ -\Phi_{\gamma\psi\phi 3}(\tau) & -\Phi_{\gamma\psi\phi 4}(\tau) & \Phi_{\gamma\psi\phi 1}(\tau) & \Phi_{\gamma\psi\phi 2}(\tau) & \ldots & -\Phi_{\gamma\psi\phi 7}(\tau) & -\Phi_{\gamma\psi\phi 8}(\tau) & \Phi_{\gamma\psi\phi 5}(\tau) & \Phi_{\gamma\psi\phi 6}(\tau) \\ \Phi_{\gamma\psi\phi 4}(\tau) & -\Phi_{\gamma\psi\phi 3}(\tau) & -\Phi_{\gamma\psi\phi 2}(\tau) & \Phi_{\gamma\psi\phi 1}(\tau) & \ldots & \Phi_{\gamma\psi\phi 8}(\tau) & -\Phi_{\gamma\psi\phi 7}(\tau) & -\Phi_{\gamma\psi\phi 6}(\tau) & \Phi_{\gamma\psi\phi 5}(\tau) \\ -\Phi_{\gamma\psi\phi 5}(\tau) & -\Phi_{\gamma\psi\phi 6}(\tau) & -\Phi_{\gamma\psi\phi 7}(\tau) & -\Phi_{\gamma\psi\phi 8}(\tau) & \ldots & \Phi_{\gamma\psi\phi 1}(\tau) & \Phi_{\gamma\psi\phi 2}(\tau) & \Phi_{\gamma\psi\phi 3}(\tau) & \Phi_{\gamma\psi\phi 4}(\tau) \\ \Phi_{\gamma\psi\phi 6}(\tau) & -\Phi_{\gamma\psi\phi 5}(\tau) & \Phi_{\gamma\psi\phi 8}(\tau) & -\Phi_{\gamma\psi\phi 7}(\tau) & \ldots & -\Phi_{\gamma\psi\phi 2}(\tau) & \Phi_{\gamma\psi\phi 1}(\tau) & -\Phi_{\gamma\psi\phi 4}(\tau) & \Phi_{\gamma\psi\phi 3}(\tau) \\ \Phi_{\gamma\psi\phi 7}(\tau) & \Phi_{\gamma\psi\phi 8}(\tau) & -\Phi_{\gamma\psi\phi 5}(\tau) & -\Phi_{\gamma\psi\phi 6}(\tau) & \ldots & -\Phi_{\gamma\psi\phi 3}(\tau) & -\Phi_{\gamma\psi\phi 4}(\tau) & \Phi_{\gamma\psi\phi 1}(\tau) & \Phi_{\gamma\psi\phi 2}(\tau) \\ -\Phi_{\gamma\psi\phi 8}(\tau) & \Phi_{\gamma\psi\phi 7}(\tau) & \Phi_{\gamma\psi\phi 6}(\tau) & -\Phi_{\gamma\psi\phi 5}(\tau) & \ldots & \Phi_{\gamma\psi\phi 4}(\tau) & -\Phi_{\gamma\psi\phi 3}(\tau) & -\Phi_{\gamma\psi\phi 2}(\tau) & \Phi_{\gamma\psi\phi 1}(\tau) \end{bmatrix}$$

where $$\Phi_{\gamma\psi\phi 1}(\tau) = \cos(\dot{\gamma} + \dot{\psi} + \dot{\phi})\tau + \cos(\dot{\gamma} + \dot{\psi} - \dot{\phi})\tau + \cos(\dot{\gamma} - \dot{\psi} + \dot{\phi})\tau + \ldots \cos(\dot{\gamma} - \dot{\psi} - \dot{\phi})\tau \quad [60]$$

$$\Phi_{\gamma\psi\phi 2}(\tau) = \sin(\dot{\gamma} + \dot{\psi} + \dot{\phi})\tau + \sin(\dot{\gamma} + \dot{\psi} - \dot{\phi})\tau - \sin(\dot{\gamma} - \dot{\psi} + \dot{\phi})\tau - \ldots \sin(\dot{\gamma} - \dot{\psi} - \dot{\phi})\tau$$

$$\Phi_{\gamma\psi\phi 3}(\tau) = \sin(\dot{\gamma} + \dot{\psi} + \dot{\phi})\tau + \sin(\dot{\gamma} + \dot{\psi} - \dot{\phi})\tau + \sin(\dot{\gamma} - \dot{\psi} + \dot{\phi})\tau + \ldots \sin(\dot{\gamma} - \dot{\psi} - \dot{\phi})\tau$$

$$\Phi_{\gamma\psi\phi 4}(\tau) = -\cos(\dot{\gamma} + \dot{\psi} + \dot{\phi})\tau - \cos(\dot{\gamma} + \dot{\psi} - \dot{\phi})\tau + \cos(\dot{\gamma} - \dot{\psi} + \dot{\phi})\tau + \ldots \cos(\dot{\gamma} - \dot{\psi} - \dot{\phi})\tau$$

$$\Phi_{\gamma\psi\phi 5}(\tau) = \sin(\dot{\gamma} + \dot{\psi} + \dot{\phi})\tau - \sin(\dot{\gamma} + \dot{\psi} - \dot{\phi})\tau + \sin(\dot{\gamma} - \dot{\psi} + \dot{\phi})\tau - \ldots \sin(\dot{\gamma} - \dot{\psi} - \dot{\phi})\tau$$

$$\Phi_{\gamma\psi\phi 6}(\tau) = -\cos(\dot{\gamma} + \dot{\psi} + \dot{\phi})\tau + \cos(\dot{\gamma} + \dot{\psi} - \dot{\phi})\tau + \cos(\dot{\gamma} - \dot{\psi} + \dot{\phi})\tau - \ldots \cos(\dot{\gamma} - \dot{\psi} - \dot{\phi})\tau$$

$$\Phi_{\gamma\psi\phi 7}(\tau) = -\cos(\dot{\gamma} + \dot{\psi} + \dot{\phi})\tau + \cos(\dot{\gamma} + \dot{\psi} - \dot{\phi})\tau - \cos(\dot{\gamma} - \dot{\psi} + \dot{\phi})\tau + \ldots \cos(\dot{\gamma} - \dot{\psi} - \dot{\phi})\tau$$

$$\Phi_{\gamma\psi\phi 8}(\tau) = -\sin(\dot{\gamma} + \dot{\psi} + \dot{\phi})\tau + \sin(\dot{\gamma} + \dot{\psi} - \dot{\phi})\tau + \sin(\dot{\gamma} - \dot{\psi} + \dot{\phi})\tau - \ldots \sin(\dot{\gamma} - \dot{\psi} - \dot{\phi})\tau$$

and $$\Phi_{\gamma\phi}(\tau) = \frac{1}{2}e^{-\frac{\Omega_\gamma \tau}{2}}\begin{bmatrix} \Phi_{\gamma\phi 1}(\tau) & \Phi_{\gamma\phi 2}(\tau) & \Phi_{\gamma\phi 3}(\tau) & \Phi_{\gamma\phi 4}(\tau) \\ -\Phi_{\gamma\phi 2}(\tau) & \Phi_{\gamma\phi 1}(\tau) & -\Phi_{\gamma\phi 4}(\tau) & \Phi_{\gamma\phi 3}(\tau) \\ -\Phi_{\gamma\phi 3}(\tau) & -\Phi_{\gamma\phi 4}(\tau) & \Phi_{\gamma\phi 1}(\tau) & \Phi_{\gamma\phi 2}(\tau) \\ \Phi_{\gamma\phi 4}(\tau) & -\Phi_{\gamma\phi 3}(\tau) & -\Phi_{\gamma\phi 2}(\tau) & \Phi_{\gamma\phi 1}(\tau) \end{bmatrix} \quad [61]$$

where $$\phi_{\gamma\phi 1}(\tau)=\cos(\gamma+\phi)\tau+\cos(\gamma-\phi)\tau$$

$$\phi_{\gamma\phi 2}(\tau)=\sin(\gamma+\phi)\tau+\sin(\gamma-\phi)\tau$$

$$\phi_{\gamma\phi 3}(\tau)=\sin(\gamma+\phi)\tau-\sin(\gamma-\phi)\tau$$

$$\phi_{\gamma\phi 4}(\tau)=-\cos(\gamma+\phi)\tau+\cos(\gamma-\phi)\tau \quad [62]$$

and $$\Phi_{\psi\phi}(\tau) = \frac{1}{2} e^{-\frac{\Omega_\psi \tau}{2}} \begin{bmatrix} \Phi_{\psi\phi 1}(\tau) & \Phi_{\psi\phi 2}(\tau) & \Phi_{\psi\phi 3}(\tau) & \Phi_{\psi\phi 4}(\tau) \\ -\Phi_{\psi\phi 2}(\tau) & \Phi_{\psi\phi 1}(\tau) & -\Phi_{\psi\phi 4}(\tau) & \Phi_{\psi\phi 3}(\tau) \\ -\Phi_{\psi\phi 3}(\tau) & -\Phi_{\psi\phi 4}(\tau) & \Phi_{\psi\phi 1}(\tau) & \Phi_{\psi\phi 2}(\tau) \\ \Phi_{\psi\phi 4}(\tau) & -\Phi_{\psi\phi 3}(\tau) & -\Phi_{\psi\phi 2}(\tau) & \Phi_{\psi\phi 1}(\tau) \end{bmatrix} \quad [63]$$

where $$\phi_{\psi\phi 1}(\tau)=\cos(\psi+\phi)\tau+\cos(\psi-\phi)\tau$$

$$\phi_{\psi\phi 2}(\tau)=\sin(\psi+\phi)\tau+\sin(\psi-\phi)\tau \quad [64]$$

$$\phi_{\psi\phi 3}(\tau)=\sin(\psi+\phi)\tau-\sin(\psi-\phi)\tau$$

$$\phi_{\psi\phi 4}(\tau)=-\cos(\psi+\phi)\tau+\cos(\psi-\phi)\tau$$

$\phi_{\gamma\psi\phi}^{(1)}, \phi_{\gamma\phi}^{(1)}$ and $\phi_{\psi\phi}^{(1)}$ are defined as $$\Phi_{\gamma\psi\phi}^{(1)}(t) = \frac{1}{4} \begin{bmatrix} \Phi_{\gamma\psi\phi 1}^{(1)}(t) & \Phi_{\gamma\psi\phi 2}^{(1)}(t) & \Phi_{\gamma\psi\phi 3}^{(1)}(t) & \Phi_{\gamma\psi\phi 4}^{(1)}(t) & \ldots & \Phi_{\gamma\psi\phi 5}^{(1)}(t) & \Phi_{\gamma\psi\phi 6}^{(1)}(t) & \Phi_{\gamma\psi\phi 7}^{(1)}(t) & \Phi_{\gamma\psi\phi 8}^{(1)}(t) \\ -\Phi_{\gamma\psi\phi 2}^{(1)}(t) & \Phi_{\gamma\psi\phi 1}^{(1)}(t) & -\Phi_{\gamma\psi\phi 4}^{(1)}(t) & \Phi_{\gamma\psi\phi 3}^{(1)}(t) & \ldots & -\Phi_{\gamma\psi\phi 6}^{(1)}(t) & \Phi_{\gamma\psi\phi 5}^{(1)}(t) & -\Phi_{\gamma\psi\phi 8}^{(1)}(t) & \Phi_{\gamma\psi\phi 7}^{(1)}(t) \\ -\Phi_{\gamma\psi\phi 3}^{(1)}(t) & -\Phi_{\gamma\psi\phi 4}^{(1)}(t) & \Phi_{\gamma\psi\phi 1}^{(1)}(t) & \Phi_{\gamma\psi\phi 2}^{(1)}(t) & \ldots & -\Phi_{\gamma\psi\phi 7}^{(1)}(t) & -\Phi_{\gamma\psi\phi 8}^{(1)}(t) & \Phi_{\gamma\psi\phi 5}^{(1)}(t) & \Phi_{\gamma\psi\phi 6}^{(1)}(t) \\ \Phi_{\gamma\psi\phi 4}^{(1)}(t) & -\Phi_{\gamma\psi\phi 3}^{(1)}(t) & -\Phi_{\gamma\psi\phi 2}^{(1)}(t) & \Phi_{\gamma\psi\phi 1}^{(1)}(t) & \ldots & \Phi_{\gamma\psi\phi 8}^{(1)}(t) & -\Phi_{\gamma\psi\phi 7}^{(1)}(t) & -\Phi_{\gamma\psi\phi 6}^{(1)}(t) & \Phi_{\gamma\psi\phi 5}^{(1)}(t) \\ -\Phi_{\gamma\psi\phi 5}^{(1)}(t) & -\Phi_{\gamma\psi\phi 6}^{(1)}(t) & -\Phi_{\gamma\psi\phi 7}^{(1)}(t) & -\Phi_{\gamma\psi\phi 8}^{(1)}(t) & \ldots & \Phi_{\gamma\psi\phi 1}^{(1)}(t) & \Phi_{\gamma\psi\phi 2}^{(1)}(t) & \Phi_{\gamma\psi\phi 3}^{(1)}(t) & \Phi_{\gamma\psi\phi 4}^{(1)}(t) \\ \Phi_{\gamma\psi\phi 6}^{(1)}(t) & -\Phi_{\gamma\psi\phi 5}^{(1)}(t) & \Phi_{\gamma\psi\phi 8}^{(1)}(t) & -\Phi_{\gamma\psi\phi 7}^{(1)}(t) & \ldots & -\Phi_{\gamma\psi\phi 2}^{(1)}(t) & \Phi_{\gamma\psi\phi 1}^{(1)}(t) & -\Phi_{\gamma\psi\phi 4}^{(1)}(t) & \Phi_{\gamma\psi\phi 3}^{(1)}(t) \\ \Phi_{\gamma\psi\phi 7}^{(1)}(t) & \Phi_{\gamma\psi\phi 8}^{(1)}(t) & -\Phi_{\gamma\psi\phi 5}^{(1)}(t) & -\Phi_{\gamma\psi\phi 6}^{(1)}(t) & \ldots & -\Phi_{\gamma\psi\phi 3}^{(1)}(t) & -\Phi_{\gamma\psi\phi 4}^{(1)}(t) & \Phi_{\gamma\psi\phi 1}^{(1)}(t) & \Phi_{\gamma\psi\phi 2}^{(1)}(t) \\ -\Phi_{\gamma\psi\phi 8}^{(1)}(t) & \Phi_{\gamma\psi\phi 7}^{(1)}(t) & \Phi_{\gamma\psi\phi 6}^{(1)}(t) & -\Phi_{\gamma\psi\phi 5}^{(1)}(t) & \ldots & \Phi_{\gamma\psi\phi 4}^{(1)}(t) & -\Phi_{\gamma\psi\phi 3}^{(1)}(t) & -\Phi_{\gamma\psi\phi 2}^{(1)}(t) & \Phi_{\gamma\psi\phi 1}^{(1)}(t) \end{bmatrix} \quad [65]$$

$$\Phi_{\gamma\psi\phi 1}^{(1)}(t) = \Phi_{\cos}^{(1)}(\Omega_\gamma+\Omega_\psi, \dot\gamma+\dot\psi+\dot\phi) + \Phi_{\cos}^{(1)}(\Omega_\gamma+\Omega_\psi, \dot\gamma+\dot\psi-\dot\phi) + \Phi_{\cos}^{(1)}(\Omega_\gamma+\Omega_\psi, \dot\gamma-\dot\psi+\dot\phi) + \Phi_{\cos}^{(1)}(\Omega_\gamma+\Omega_\psi, \dot\gamma-\dot\psi-\dot\phi) \quad [66]$$

$$\Phi_{\gamma\psi\phi 2}^{(1)}(t) = \Phi_{\sin}^{(1)}(\Omega_\gamma+\Omega_\psi, \dot\gamma+\dot\psi+\dot\phi) + \Phi_{\sin}^{(1)}(\Omega_\gamma+\Omega_\psi, \dot\gamma+\dot\psi-\dot\phi) - \Phi_{\sin}^{(1)}(\Omega_\gamma+\Omega_\psi, \dot\gamma-\dot\psi+\dot\phi) - \Phi_{\sin}^{(1)}(\Omega_\gamma+\Omega_\psi, \dot\gamma-\dot\psi-\dot\phi)$$

$$\Phi_{\gamma\psi\phi 3}^{(1)}(t) = \Phi_{\sin}^{(1)}(\Omega_\gamma+\Omega_\psi, \dot\gamma+\dot\psi+\dot\phi) + \Phi_{\sin}^{(1)}(\Omega_\gamma+\Omega_\psi, \dot\gamma+\dot\psi-\dot\phi) + \Phi_{\sin}^{(1)}(\Omega_\gamma+\Omega_\psi, \dot\gamma-\dot\psi+\dot\phi) + \Phi_{\sin}^{(1)}(\Omega_\gamma+\Omega_\psi, \dot\gamma-\dot\psi-\dot\phi)$$

$$\Phi_{\gamma\psi\phi 4}^{(1)}(t) = -\Phi_{\cos}^{(1)}(\Omega_\gamma+\Omega_\psi, \dot\gamma+\dot\psi+\dot\phi) - \Phi_{\cos}^{(1)}(\Omega_\gamma+\Omega_\psi, \dot\gamma+\dot\psi-\dot\phi) + \Phi_{\cos}^{(1)}(\Omega_\gamma+\Omega_\psi, \dot\gamma-\dot\psi+\dot\phi) + \Phi_{\cos}^{(1)}(\Omega_\gamma+\Omega_\psi, \dot\gamma-\dot\psi-\dot\phi)$$

$$\Phi_{\gamma\psi\phi 5}^{(1)}(t) = \Phi_{\sin}^{(1)}(\Omega_\gamma+\Omega_\psi, \dot\gamma+\dot\psi+\dot\phi) - \Phi_{\sin}^{(1)}(\Omega_\gamma+\Omega_\psi, \dot\gamma+\dot\psi-\dot\phi) + \Phi_{\sin}^{(1)}(\Omega_\gamma+\Omega_\psi, \dot\gamma-\dot\psi+\dot\phi) - \Phi_{\sin}^{(1)}(\Omega_\gamma+\Omega_\psi, \dot\gamma-\dot\psi-\dot\phi)$$

$$\Phi_{\gamma\psi\phi 6}^{(1)}(t) = -\Phi_{\cos}^{(1)}(\Omega_\gamma+\Omega_\psi, \dot\gamma+\dot\psi+\dot\phi) + \Phi_{\cos}^{(1)}(\Omega_\gamma+\Omega_\psi, \dot\gamma+\dot\psi-\dot\phi) + \Phi_{\cos}^{(1)}(\Omega_\gamma+\Omega_\psi, \dot\gamma-\dot\psi+\dot\phi) - \Phi_{\cos}^{(1)}(\Omega_\gamma+\Omega_\psi, \dot\gamma-\dot\psi-\dot\phi)$$

$$\Phi_{\gamma\psi\phi 7}^{(1)}(t) = -\Phi_{\cos}^{(1)}(\Omega_\gamma+\Omega_\psi, \dot\gamma+\dot\psi+\dot\phi) + \Phi_{\cos}^{(1)}(\Omega_\gamma+\Omega_\psi, \dot\gamma+\dot\psi-\dot\phi) - \Phi_{\cos}^{(1)}(\Omega_\gamma+\Omega_\psi, \dot\gamma-\dot\psi+\dot\phi) + \Phi_{\cos}^{(1)}(\Omega_\gamma+\Omega_\psi, \dot\gamma-\dot\psi-\dot\phi)$$

$$\Phi_{\gamma\psi\phi 8}^{(1)}(t) = -\Phi_{\sin}^{(1)}(\Omega_\gamma+\Omega_\psi, \dot\gamma+\dot\psi+\dot\phi) + \Phi_{\sin}^{(1)}(\Omega_\gamma+\Omega_\psi, \dot\gamma+\dot\psi-\dot\phi) + \Phi_{\sin}^{(1)}(\Omega_\gamma+\Omega_\psi, \dot\gamma-\dot\psi+\dot\phi) - \Phi_{\sin}^{(1)}(\Omega_\gamma+\Omega_\psi, \dot\gamma-\dot\psi-\dot\phi)$$

$$\Phi_{\gamma\phi}^{(1)}(t) = \frac{1}{2} \begin{bmatrix} \Phi_{\gamma\phi 1}^{(1)}(t) & \Phi_{\gamma\phi 2}^{(1)}(t) & \Phi_{\gamma\phi 3}^{(1)}(t) & \Phi_{\gamma\phi 4}^{(1)}(t) \\ -\Phi_{\gamma\phi 2}^{(1)}(t) & \Phi_{\gamma\phi 1}^{(1)}(t) & -\Phi_{\gamma\phi 4}^{(1)}(t) & \Phi_{\gamma\phi 3}^{(1)}(t) \\ -\Phi_{\gamma\phi 3}^{(1)}(t) & -\Phi_{\gamma\phi 4}^{(1)}(t) & \Phi_{\gamma\phi 1}^{(1)}(t) & \Phi_{\gamma\phi 2}^{(1)}(t) \\ \Phi_{\gamma\phi 4}^{(1)}(t) & -\Phi_{\gamma\phi 3}^{(1)}(t) & -\Phi_{\gamma\phi 2}^{(1)}(t) & \Phi_{\gamma\phi 1}^{(1)}(t) \end{bmatrix} \quad [67]$$

$$\phi_{\gamma\phi 1}^{(1)}(t)=\phi_{\cos}^{(1)}(\Omega_\gamma, \gamma+\phi)+\phi_{\cos}^{(1)}(\Omega_\gamma, \gamma-\phi)$$

$$\phi_{\gamma\phi 2}^{(1)}(t)=\phi_{\sin}^{(1)}(\Omega_\gamma, \gamma+\phi)+\phi_{\sin}^{(1)}(\Omega_\gamma, \gamma-\phi)$$

$$\phi_{\gamma\phi 3}^{(1)}(t)=\phi_{\sin}^{(1)}(\Omega_\gamma, \gamma+\phi)+\phi_{\sin}^{(1)}(\Omega_\gamma, \gamma-\phi)$$

$$\phi_{\gamma\phi 4}^{(1)}(t)=-\phi_{\cos}^{(1)}(\Omega_\gamma, \gamma+\phi)+\phi_{\cos}^{(1)}(\Omega_\gamma, \gamma-\phi) \quad [68]$$

$$\Phi_{\psi\phi}^{(1)}(t) = \frac{1}{2} \begin{bmatrix} \Phi_{\psi\phi 1}^{(1)}(t) & \Phi_{\psi\phi 2}^{(1)}(t) & \Phi_{\psi\phi 3}^{(1)}(t) & \Phi_{\psi\phi 4}^{(1)}(t) \\ -\Phi_{\psi\phi 2}^{(1)}(t) & \Phi_{\psi\phi 1}^{(1)}(t) & -\Phi_{\psi\phi 4}^{(1)}(t) & \Phi_{\psi\phi 3}^{(1)}(t) \\ -\Phi_{\psi\phi 3}^{(1)}(t) & -\Phi_{\psi\phi 4}^{(1)}(t) & \Phi_{\psi\phi 1}^{(1)}(t) & \Phi_{\psi\phi 2}^{(1)}(t) \\ \Phi_{\psi\phi 4}^{(1)}(t) & -\Phi_{\psi\phi 3}^{(1)}(t) & -\Phi_{\psi\phi 2}^{(1)}(t) & \Phi_{\psi\phi 1}^{(1)}(t) \end{bmatrix} \quad [69]$$

$$\phi_{\psi\phi 1}^{(1)}(t)=\phi_{\cos}^{(1)}(\Omega_\psi, \psi+\phi)+\phi_{\cos}^{(1)}(\Omega_\psi, \psi-\phi)$$

$$\phi_{\psi\phi 2}^{(1)}(t)=\phi_{\sin}^{(1)}(\Omega_\psi, \psi+\phi)+\phi_{\sin}^{(1)}(\Omega_\psi, \psi-\phi)$$

$$\phi_{\psi\phi 3}^{(1)}(t)=\phi_{\sin}^{(1)}(\Omega_\psi, \psi+\phi)-\phi_{\sin}^{(1)}(\Omega_{\sin}^{(1)}(\Omega_\psi, \psi-\phi)$$

$$\phi_{\psi\phi 4}^{(1)}(t)=-\phi_{\cos}^{(1)}(\Omega_\psi, \psi+\phi)+\phi_{\cos}^{(1)}(\Omega_\psi, \psi-\phi) \quad [70]$$

where $$\Phi^{(1)}_{\sin}(\Omega, \omega) = \frac{1}{\frac{\Omega^2}{4} + \omega^2}\left[\omega\left(1 - e^{-\frac{\Omega T_{go}}{2}}\cos\omega T_{go}\right) + \frac{\Omega}{2}e^{-\frac{\Omega T_{go}}{2}}\sin\omega T_{go}\right] \quad [71]$$

$$\Phi^{(1)}_{\cos}(\Omega, \omega) = \frac{1}{\frac{\Omega^2}{4} + \omega^2}\left[\frac{\Omega}{2}\left(1 - e^{-\frac{\Omega T_{go}}{2}}\cos\omega T_{go}\right) - \omega e^{-\frac{\Omega T_{go}}{2}}\sin\omega T_{go}\right]$$

$\phi^{(2)}_{\gamma\psi\phi}$, $\phi^{(2)}_{\gamma\phi}$ and $\phi^{(2)}_{\psi\phi}$ may be defined as $$\Phi^{(2)}_{\gamma\psi\phi}(t) = \frac{1}{4}\begin{bmatrix} \Phi^{(2)}_{\gamma\psi\phi 1}(t) & \Phi^{(2)}_{\gamma\psi\phi 2}(t) & \Phi^{(2)}_{\gamma\psi\phi 3}(t) & \Phi^{(2)}_{\gamma\psi\phi 4}(t) & \ldots & \Phi^{(2)}_{\gamma\psi\phi 5}(t) & \Phi^{(2)}_{\gamma\psi\phi 6}(t) & \Phi^{(2)}_{\gamma\psi\phi 7}(t) & \Phi^{(2)}_{\gamma\psi\phi 8}(t) \\ -\Phi^{(2)}_{\gamma\psi\phi 2}(t) & \Phi^{(2)}_{\gamma\psi\phi 1}(t) & -\Phi^{(2)}_{\gamma\psi\phi 4}(t) & \Phi^{(2)}_{\gamma\psi\phi 3}(t) & \ldots & -\Phi^{(2)}_{\gamma\psi\phi 6}(t) & \Phi^{(2)}_{\gamma\psi\phi 5}(t) & -\Phi^{(2)}_{\gamma\psi\phi 8}(t) & \Phi^{(2)}_{\gamma\psi\phi 7}(t) \\ -\Phi^{(2)}_{\gamma\psi\phi 3}(t) & -\Phi^{(2)}_{\gamma\psi\phi 4}(t) & \Phi^{(2)}_{\gamma\psi\phi 1}(t) & \Phi^{(2)}_{\gamma\psi\phi 2}(t) & \ldots & -\Phi^{(2)}_{\gamma\psi\phi 7}(t) & -\Phi^{(2)}_{\gamma\psi\phi 8}(t) & \Phi^{(2)}_{\gamma\psi\phi 5}(t) & \Phi^{(2)}_{\gamma\psi\phi 6}(t) \\ \Phi^{(2)}_{\gamma\psi\phi 4}(t) & -\Phi^{(2)}_{\gamma\psi\phi 3}(t) & -\Phi^{(2)}_{\gamma\psi\phi 2}(t) & \Phi^{(2)}_{\gamma\psi\phi 1}(t) & \ldots & \Phi^{(2)}_{\gamma\psi\phi 8}(t) & -\Phi^{(2)}_{\gamma\psi\phi 7}(t) & -\Phi^{(2)}_{\gamma\psi\phi 6}(t) & \Phi^{(2)}_{\gamma\psi\phi 5}(t) \\ -\Phi^{(2)}_{\gamma\psi\phi 5}(t) & -\Phi^{(2)}_{\gamma\psi\phi 6}(t) & -\Phi^{(2)}_{\gamma\psi\phi 7}(t) & -\Phi^{(2)}_{\gamma\psi\phi 8}(t) & \ldots & \Phi^{(2)}_{\gamma\psi\phi 1}(t) & \Phi^{(2)}_{\gamma\psi\phi 2}(t) & \Phi^{(2)}_{\gamma\psi\phi 3}(t) & \Phi^{(2)}_{\gamma\psi\phi 4}(t) \\ \Phi^{(2)}_{\gamma\psi\phi 6}(t) & -\Phi^{(2)}_{\gamma\psi\phi 5}(t) & \Phi^{(2)}_{\gamma\psi\phi 8}(t) & -\Phi^{(2)}_{\gamma\psi\phi 7}(t) & \ldots & -\Phi^{(2)}_{\gamma\psi\phi 2}(t) & \Phi^{(2)}_{\gamma\psi\phi 1}(t) & -\Phi^{(2)}_{\gamma\psi\phi 4}(t) & \Phi^{(2)}_{\gamma\psi\phi 3}(t) \\ \Phi^{(2)}_{\gamma\psi\phi 7}(t) & \Phi^{(2)}_{\gamma\psi\phi 8}(t) & -\Phi^{(2)}_{\gamma\psi\phi 5}(t) & -\Phi^{(2)}_{\gamma\psi\phi 6}(t) & \ldots & -\Phi^{(2)}_{\gamma\psi\phi 3}(t) & -\Phi^{(2)}_{\gamma\psi\phi 4}(t) & \Phi^{(2)}_{\gamma\psi\phi 1}(t) & \Phi^{(2)}_{\gamma\psi\phi 2}(t) \\ -\Phi^{(2)}_{\gamma\psi\phi 8}(t) & \Phi^{(2)}_{\gamma\psi\phi 7}(t) & \Phi^{(2)}_{\gamma\psi\phi 6}(t) & -\Phi^{(2)}_{\gamma\psi\phi 5}(t) & \ldots & \Phi^{(2)}_{\gamma\psi\phi 4}(t) & -\Phi^{(2)}_{\gamma\psi\phi 3}(t) & -\Phi^{(2)}_{\gamma\psi\phi 2}(t) & \Phi^{(2)}_{\gamma\psi\phi 1}(t) \end{bmatrix} \quad [72]$$

$$\Phi^{(2)}_{\gamma\psi\phi 1}(t) = \Phi^{(2)}_{\cos}(\Omega_\gamma + \Omega_\psi, \dot{\gamma} + \dot{\psi} + \dot{\phi}) + \Phi^{(2)}_{\cos}(\Omega_\gamma + \Omega_\psi, \dot{\gamma} + \dot{\psi} - \dot{\phi}) + \Phi^{(2)}_{\cos}(\Omega_\gamma + \Omega_\psi, \dot{\gamma} - \dot{\psi} + \dot{\phi}) + \Phi^{(2)}_{\cos}(\Omega_\gamma + \Omega_\psi, \dot{\gamma} - \dot{\psi} - \dot{\phi}) \quad [73]$$

$$\Phi^{(2)}_{\gamma\psi\phi 2}(t) = \Phi^{(2)}_{\sin}(\Omega_\gamma + \Omega_\psi, \dot{\gamma} + \dot{\psi} + \dot{\phi}) + \Phi^{(2)}_{\sin}(\Omega_\gamma + \Omega_\psi, \dot{\gamma} + \dot{\psi} - \dot{\phi}) - \Phi^{(2)}_{\sin}(\Omega_\gamma + \Omega_\psi, \dot{\gamma} - \dot{\psi} + \dot{\phi}) - \Phi^{(2)}_{\sin}(\Omega_\gamma + \Omega_\psi, \dot{\gamma} - \dot{\psi} - \dot{\phi})$$

$$\Phi^{(2)}_{\gamma\psi\phi 3}(t) = \Phi^{(2)}_{\sin}(\Omega_\gamma + \Omega_\psi, \dot{\gamma} + \dot{\psi} + \dot{\phi}) + \Phi^{(2)}_{\sin}(\Omega_\gamma + \Omega_\psi, \dot{\gamma} + \dot{\psi} - \dot{\phi}) + \Phi^{(2)}_{\sin}(\Omega_\gamma + \Omega_\psi, \dot{\gamma} - \dot{\psi} + \dot{\phi}) + \Phi^{(2)}_{\sin}(\Omega_\gamma + \Omega_\psi, \dot{\gamma} - \dot{\psi} - \dot{\phi})$$

$$\Phi^{(2)}_{\gamma\psi\phi 4}(t) = -\Phi^{(2)}_{\cos}(\Omega_\gamma + \Omega_\psi, \dot{\gamma} + \dot{\psi} + \dot{\phi}) - \Phi^{(2)}_{\cos}(\Omega_\gamma + \Omega_\psi, \dot{\gamma} + \dot{\psi} - \dot{\phi}) + \Phi^{(2)}_{\cos}(\Omega_\gamma + \Omega_\psi, \dot{\gamma} - \dot{\psi} + \dot{\phi}) + \Phi^{(2)}_{\cos}(\Omega_\gamma + \Omega_\psi, \dot{\gamma} - \dot{\psi} - \dot{\phi})$$

$$\Phi^{(2)}_{\gamma\psi\phi 5}(t) = \Phi^{(2)}_{\sin}(\Omega_\gamma + \Omega_\psi, \dot{\gamma} + \dot{\psi} + \dot{\phi}) - \Phi^{(2)}_{\sin}(\Omega_\gamma + \Omega_\psi, \dot{\gamma} + \dot{\psi} - \dot{\phi}) + \Phi^{(2)}_{\sin}(\Omega_\gamma + \Omega_\psi, \dot{\gamma} - \dot{\psi} + \dot{\phi}) - \Phi^{(2)}_{\sin}(\Omega_\gamma + \Omega_\psi, \dot{\gamma} - \dot{\psi} - \dot{\phi})$$

$$\Phi^{(2)}_{\gamma\psi\phi 6}(t) = -\Phi^{(2)}_{\cos}(\Omega_\gamma + \Omega_\psi, \dot{\gamma} + \dot{\psi} + \dot{\phi}) + \Phi^{(2)}_{\cos}(\Omega_\gamma + \Omega_\psi, \dot{\gamma} + \dot{\psi} - \dot{\phi}) + \Phi^{(2)}_{\cos}(\Omega_\gamma + \Omega_\psi, \dot{\gamma} - \dot{\psi} + \dot{\phi}) - \Phi^{(2)}_{\cos}(\Omega_\gamma + \Omega_\psi, \dot{\gamma} - \dot{\psi} - \dot{\phi})$$

$$\Phi^{(2)}_{\gamma\psi\phi 7}(t) = -\Phi^{(2)}_{\cos}(\Omega_\gamma + \Omega_\psi, \dot{\gamma} + \dot{\psi} + \dot{\phi}) + \Phi^{(2)}_{\cos}(\Omega_\gamma + \Omega_\psi, \dot{\gamma} + \dot{\psi} - \dot{\phi}) - \Phi^{(2)}_{\cos}(\Omega_\gamma + \Omega_\psi, \dot{\gamma} - \dot{\psi} + \dot{\phi}) + \Phi^{(2)}_{\cos}(\Omega_\gamma + \Omega_\psi, \dot{\gamma} - \dot{\psi} - \dot{\phi})$$

$$\Phi^{(2)}_{\gamma\psi\phi 8}(t) = -\Phi^{(2)}_{\sin}(\Omega_\gamma + \Omega_\psi, \dot{\gamma} + \dot{\psi} + \dot{\phi}) + \Phi^{(2)}_{\sin}(\Omega_\gamma + \Omega_\psi, \dot{\gamma} + \dot{\psi} - \dot{\phi}) + \Phi^{(2)}_{\sin}(\Omega_\gamma + \Omega_\psi, \dot{\gamma} - \dot{\psi} + \dot{\phi}) - \Phi^{(2)}_{\sin}(\Omega_\gamma + \Omega_\psi, \dot{\gamma} - \dot{\psi} - \dot{\phi})$$

$$\Phi^{(2)}_{\gamma\phi}(t) = \frac{1}{2}\begin{bmatrix} \Phi^{(2)}_{\gamma\phi 1}(t) & \Phi^{(2)}_{\gamma\phi 2}(t) & \Phi^{(2)}_{\gamma\phi 3}(t) & \Phi^{(2)}_{\gamma\phi 4}(t) \\ -\Phi^{(2)}_{\gamma\phi 2}(t) & \Phi^{(2)}_{\gamma\phi 1}(t) & -\Phi^{(2)}_{\gamma\phi 4}(t) & \Phi^{(2)}_{\gamma\phi 3}(t) \\ -\Phi^{(2)}_{\gamma\phi 3}(t) & -\Phi^{(2)}_{\gamma\phi 4}(t) & \Phi^{(2)}_{\gamma\phi 1}(t) & \Phi^{(2)}_{\gamma\phi 2}(t) \\ \Phi^{(2)}_{\gamma\phi 4}(t) & -\Phi^{(2)}_{\gamma\phi 3}(t) & -\Phi^{(2)}_{\gamma\phi 2}(t) & \Phi^{(2)}_{\gamma\phi 1}(t) \end{bmatrix} \quad [74]$$

$\phi^{(2)}_{\gamma\phi 1}(t) = \phi^{(2)}_{cos}(\Omega_\gamma, \gamma+\phi) + \phi^{(2)}_{cos}(\Omega_\gamma, \gamma-\phi)$ $\phi^{(2)}_{\gamma\phi 2}(t) = \phi^{(2)}_{sin}(\Omega_\gamma, \gamma+\phi) + \phi^{(2)}_{sin}(\Omega_\gamma, \gamma-\phi)$ $\phi^{(2)}_{\gamma\phi 3}(t) = \phi^{(2)}_{sin}(\Omega_\gamma, \gamma+\phi) - \phi^{(2)}_{sin}(\Omega_\gamma, \gamma-\phi)$ $\phi^{(2)}_{\gamma\phi 4}(t) = -\phi^{(2)}_{cos}(\Omega_\gamma, \gamma+\phi) + {}_{100}{}_{cos}{}^{(2)}(\Omega_\gamma, \gamma-\phi)$ [75]

$$\Phi^{(2)}_{\psi\phi}(t) = \frac{1}{2}\begin{bmatrix} \Phi^{(2)}_{\psi\phi 1}(t) & \Phi^{(2)}_{\psi\phi 2}(t) & \Phi^{(2)}_{\psi\phi 3}(t) & \Phi^{(2)}_{\psi\phi 4}(t) \\ -\Phi^{(2)}_{\psi\phi 2}(t) & \Phi^{(2)}_{\psi\phi 1}(t) & -\Phi^{(2)}_{\psi\phi 4}(t) & \Phi^{(2)}_{\psi\phi 3}(t) \\ -\Phi^{(2)}_{\psi\phi 3}(t) & -\Phi^{(2)}_{\psi\phi 4}(t) & \Phi^{(2)}_{\psi\phi 1}(t) & \Phi^{(2)}_{\psi\phi 2}(t) \\ \Phi^{(2)}_{\psi\phi 4}(t) & -\Phi^{(2)}_{\psi\phi 3}(t) & -\Phi^{(2)}_{\psi\phi 2}(t) & \Phi^{(2)}_{\psi\phi 1}(t) \end{bmatrix} \quad [76]$$

$\phi^{(2)}_{\psi\phi 1}(t) = \phi^{(2)}_{cos}(\Omega_\psi, \psi+\phi) + \phi^{(2)}_{cos}(\Omega_\psi, \psi-\phi)$ $\phi^{(2)}_{\psi\phi 2}(t) = \phi^{(2)}_{sin}(\Omega_\psi, \psi+\phi) + \phi^{(2)}_{sin}(\Omega_\psi, \psi-\phi)$ $\phi^{(2)}_{\psi\phi 3}(t) = \phi^{(2)}_{sin}(\Omega_\psi, \psi+\phi) - \phi^{(2)}_{sin}(\Omega_\psi, \psi-\phi)$ $\phi^{(2)}_{\psi\phi 4}(t) = -\phi^{(2)}_{cos}(\Omega_\psi, \psi+\phi) + \phi^{(2)}_{cos}(\Omega_\psi, \psi-\phi)$ [77]

where $$\Phi^{(2)}_{\sin}(\Omega, \omega) = \frac{-1}{\frac{\Omega^2}{4} + \omega^2}\left[\omega T_{go} + \frac{\omega\Omega}{\frac{\Omega^2}{4} + \omega^2}\left(1 - e^{-\frac{\Omega T_{go}}{2}}\cos\omega T_{go}\right) + \frac{\frac{\Omega^2}{4} - \omega^2}{\frac{\Omega^2}{4} + \omega^2}e^{-\frac{\Omega T_{go}}{2}}\sin\omega T_{go}\right] \quad [78]$$

-continued $$\Phi_{\cos}^{(2)}(\Omega, \omega) = \frac{-1}{\frac{\Omega^2}{4}+\omega^2}\left[\frac{\Omega T_{go}}{2}+\frac{\frac{\Omega^2}{4}-\omega^2}{\frac{\Omega^2}{4}+\omega^2}\left(1-e^{-\frac{\Omega T_{go}}{2}}\cos\omega T_{go}\right)-\frac{\omega\Omega}{\frac{\Omega^2}{4}+\omega^2}e^{-\frac{\Omega T_{go}}{2}}\sin\omega T_{go}\right]$$

These solutions are functions of $x_r, y_r, z_r, u_r, v_r, \omega_r, \bar{a}_{1x}, \bar{a}_{1y}, \bar{a}_{1z}, a_1, a_2 \ldots a_{16}, \phi, \gamma, \psi$ and the time-to-go $T_{go}=t_f-t$. When implementing the guidance law, $x_r, y_r, z_r, u_r, v_r, \omega_r, a_1, a_2 \ldots a_{16}$ and $\phi$ are estimated as $\hat{x}$. The intercept acceleration, $\bar{a}_{1x}, \bar{a}_{1y},$ and $\bar{a}_{1z}$, are measured. The target angular velocity can be estimated by $$\dot{\gamma} = \frac{\vec{a}_T \cdot \vec{a}_1}{v_T} \quad [79]$$

$$\dot{\psi} = \frac{\vec{a}_T \cdot \vec{a}_2}{v_T \cos\gamma}$$

where $$v_t = \sqrt{(u_r+v_{1x})^2+(v_r+v_{1y})^2+(\omega_r+v_{1z})^2} \quad [80]$$

and $\bar{a}_T, \bar{a}_1$ and $\bar{a}_2$ can be obtained from equation 42, equation 36 and equation 37, respectively, with $$\gamma = \sin^{-1}\frac{v_r+v_{ly}}{\sqrt{(u_r+v_{lx})^2+(v_r+v_{ly})^2+(\omega_r+v_{lz})^2}} \quad [81]$$

$$\psi = \tan^{-1}\frac{\omega_r+v_{lz}}{u_r+v_{lx}}$$

The time-to-go can be estimated by $$T_{go} = \frac{R}{\dot{R}} = \frac{x_r^2+y_r^2+z_r^2}{x_r u_r+y_r v_r+z_r \omega_r} \quad [82]$$

3.4 Special Case

In this section, a special case of the TAE/LQGL algorithm is developed when the bank angle rate of the target acceleration vector is zero, i.e., the bank angle is a constant.

3.4.1 Target Model

When the bank angle is a constant, the target states are defined as $$a_1 = a_T \cos\phi \sin(\gamma+\omega_\gamma) \sin(\psi+\omega_\psi)$$

$$a_2 = a_T \cos\phi \sin(\gamma+\omega_\gamma) \cos(\psi+\omega_\psi)$$

$$a_3 = a_T \cos\phi \cos(\gamma+\omega_\gamma) \sin(\psi+\omega_\psi)$$

$$a_4 = a_T \cos\phi \cos(\gamma+\omega_\gamma) \cos(\psi+\omega_\psi) \quad [83]$$

$$a_5 = a_T \cos\phi \sin(\gamma+\omega_\gamma)$$

$$a_6 = a_T \cos\phi \cos(\gamma+\omega_\gamma)$$

$$a_7 = a_T \sin\phi \sin(\psi+\omega_\psi)$$

$$a_8 = a_T \sin\phi \cos(\psi+\omega_\psi)$$

Then, equation 40 becomes $$\bar{a} = (-a_2+a_7)\vec{i}+a_6\vec{j}+(-a_1-a_8)\vec{k} \quad [84]$$

and therefore $$a_{Tx} = -a_2+a_7$$

$$a_{Ty} = a_6$$

$$a_{Tz} = -a_1-a_8 \quad [85]$$

By taking the Ito stochastic differential of equation 83, the target model is obtained as $$\begin{bmatrix}\dot{a}_1\\\dot{a}_2\\\dot{a}_3\\\dot{a}_4\end{bmatrix} = \begin{bmatrix}-\frac{\Omega_\gamma+\Omega_\psi}{2} & \dot{\psi} & \dot{\gamma} & 0\\-\dot{\psi} & -\frac{\Omega_\gamma+\Omega_\psi}{2} & 0 & \dot{\gamma}\\-\dot{\gamma} & 0 & -\frac{\Omega_\gamma+\Omega_\psi}{2} & \dot{\psi}\\0 & -\dot{\gamma} & -\dot{\psi} & -\frac{\Omega_\gamma+\Omega_\psi}{2}\end{bmatrix}\begin{bmatrix}a_1\\a_2\\a_3\\a_4\end{bmatrix}+\begin{bmatrix}a_3 & a_2\\a_4 & -a_1\\-a_1 & a_4\\-a_2 & -a_3\end{bmatrix}\begin{bmatrix}\omega_\gamma\\\omega_\psi\end{bmatrix} \quad [86.1]$$

$$\begin{bmatrix}\dot{a}_5\\\dot{a}_6\end{bmatrix} = \begin{bmatrix}-\frac{\Omega_\gamma}{2} & \dot{\gamma}\\-\dot{\gamma} & -\frac{\Omega_\gamma}{2}\end{bmatrix}\begin{bmatrix}a_5\\a_6\end{bmatrix}+\begin{bmatrix}a_6\\-a_5\end{bmatrix}\omega_\gamma \quad [86.2]$$

-continued $$\begin{bmatrix} \dot{a}_7 \\ \dot{a}_8 \end{bmatrix} = \begin{bmatrix} -\dfrac{\Omega_\psi}{2} & \dot{\psi} \\ -\dot{\psi} & -\dfrac{\Omega_\psi}{2} \end{bmatrix} \begin{bmatrix} a_7 \\ a_8 \end{bmatrix} + \begin{bmatrix} a_8 \\ -a_7 \end{bmatrix} \omega_\psi \qquad [86.3]$$

where $\omega_\gamma$ and $\omega_\psi$ are zero mean, white Gaussian process with power spectral densities $\Omega_\gamma$ and $\Omega_\psi$, respectively, Finally, there are only two pseudo-measurements in the exemplary structural development because of the trigonometry on fit target states.

$$z_{p2} = a_1^2 + a_2^2 - a_5^2 + v_{p2}$$

$$z_{p3} = a_3^2 + a_4^2 - a_6^2 + v_{p3} \qquad [87]$$

where $v_{p2}$ and $v_{p3}$ are zero mean, white Gaussian process with variance $v_{p2}$ and $v_{p3}$, respectively, representing the uncertainty in the target states

3.4.2 Target Acceleration Estimator

In this section, the TAE structure is explained by using the extended Kalman filter to estimate the engagement states based on equation 33.1 to equation 33.6 and equation 86. Let the states x, inputs u, state-dependent process noise $\omega$, measurements z and sensor noise v be $$x = [x_r, y_r, z_r, u_r, v_r, \omega_r, a_1, a_2, \ldots, a_8]^T$$

$$u = [\bar{a}_{1x}, \bar{a}_{1y}, \bar{a}_{1z}]^T$$

$$\omega = [\omega_\gamma, \omega_\gamma]^T \qquad [88]$$

$$z = [z_{al}, z_{az}, z_R, z_{\dot{R}}, z_{p1}, z_{p2}, z_{p3}]^T$$

$$v = [v_{el}, v_{az}, v_R, v_{\dot{R}}, v_{p1}, v_{p2}, v_{p3}]^T$$

Then, the system dynamics and measurement equation for the filter design can be written as $$\dot{x} = f(x) + Bu + G(x)\omega$$

$$z = h(x) + v \qquad [89]$$

where f(x) represented by equation 33.1 to equation 33.6 and equation 86, and h(x) is represented by equation 34, equation 46 and equation 87.

Since the system dynamics and measurement equation are nonlinear, the extended Kalman filter, which includes a time propagation step and a measurement update step, may be used to estimate the states. The a priori state estimate may be represented as $\bar{x}(t=t_{i-1})$ and the a priori error covariance may be represented as $\bar{P}(t|t_{i-1})$ where $t_{i-1} \leq t \leq t_i$. The a posteriori state estimate may be denoted as $\hat{x}(t_i)$ and the a posteriori error covariance may be denoted as $P(t_i)$. The state covariance $E[x(t)x(t)^T]$ may be denoted as $X(t)$ because of the state-dependent process noise. For the time propagation, $\bar{x}(t|t_{i-1})$ and $\bar{P}(t|t_{i-1})$ may be propagated from the current time $t_{i-1}$ to the next sample time $t_i$ by integrating $$\dot{\bar{x}}(t|t_{i-1}) = f[\bar{x}(t|t_{i-1})] + Bu(t)$$

$$\dot{\bar{P}}(t|t_{i-1}) = A(t)\bar{P}(t|t_{i-1}) + \bar{P}(t|t_{i-1})A(t)^T + E\{G[x(t)]\Omega G[x(t)]^T\} \qquad [90]$$

with the initial condition $\bar{x}(t_{i-1}|t_{i-1}) = \hat{x}(t_{i-1})$ and $\bar{P}(t_{i-1}|t_{i-1}) = P(t_{i-1})$ where $$A(t) = \left.\dfrac{\partial f}{\partial x}\right|_{x=\bar{x}(t|t_{i-1})} \qquad [91]$$

The term due to the state-dependent process noise $E\{G[x(t)]\Omega G[x(t)]^T\}$ may be determined by integrating $$\dot{X}(t) = A(t)X(t) + X(t)A(t)^T + E\{G[x(t)]\Omega G[x(t)]^T\} \qquad [92]$$

where $$\Omega = \begin{bmatrix} \Omega_\gamma & 0 \\ 0 & \Omega_\psi \end{bmatrix} \qquad [93]$$

For the measurement update, $\hat{x}(t_i)$ and $P(t_i)$ may be updated by applying $$\hat{x}(t_i) = \bar{x}(t_i|t_{i-1}) + K(t_i)\{z(t_i) - h[\bar{x}(t_i|t_{i-1})]\}$$

$$P(t_i) = [I - K(t_i)H(t_i)]\bar{P}(t_i|t_{i-1})[I - K(t_i)H(t_i)]^T + K(t_i)VK(t_i)^T \qquad [94]$$

where the filter gain may be represented as $$K(t_i) = \bar{P}(t_i|t_{i-1})H(t_i)^T[H(t_i)\bar{P}(t_i|t_{i-1})H(t_i)^T + V]^{-1} \qquad [95]$$

and the linearized measurement matrix may be represented as $$H(t_i) = \left.\dfrac{\partial h}{\partial x}\right|_{x=\bar{x}(t|t_{i-1})} \qquad [96]$$

and V is a diagonal matrix with $V_{el}, V_{az}, V_R, V_{\dot{R}}, V_{p1}, V_{p2}$ and $V_{p3}$ on the diagonal line.

3.4.3 Linear Quadratic Guidance Law

In this section, the LQGL structure is described by solving a deterministic linear quadratic optimization problem. For the derivation of the guidance law, i.e., the LQGL, it is assumed that the heading angular velocity, $\dot{\psi}$, is constant. The optimization problem for determining the guidance law may be represented as $$\min_{a_{lx}, a_{ly}, a_{lz}} \dfrac{1}{2}[x_r(t_f)^2 + y_r(t_f)^2 + z_r(t_f)^2] + \dfrac{c}{2}\int_t^{t_f}[a_{lx}(\tau)^2 + a_{ly}(\tau)^2 + a_{lz}(\tau)^2]d\tau \qquad [97]$$

subject to equation 33 and equation 86 without the noise $\omega_\gamma$ and $\omega_\psi$, where c is a design parameter, t is the current time and $t_f$ is the final time. The optimal solutions of the above exemplary objective function of equation 97 for the intercept acceleration commands $a^*_{1x}$, $a^*_{1y}$ and $a^*_{1z}$ are as follows.

$$a^*_{Ix}(t) = -\frac{2}{\alpha}(1 - \alpha T_{go} - e^{-\alpha T_{go}})\left(2c + \frac{2T_{go}^3}{3} - \frac{2T_{go}^2}{\alpha} + \frac{2T_{go}}{\alpha^2} + \frac{1}{\alpha^3} - \frac{4T_{go}e^{-\alpha T_{go}}}{\alpha^2} - \frac{e^{-2\alpha T_{go}}}{\alpha^3}\right)^{-1} \quad [98.1]$$

$$\left\{x_r(t) + T_{go}u_r(t) + \frac{1}{\alpha^2}(1 - \alpha T_{go} - e^{-\alpha T_{go}})\overline{\alpha}_{Ix}(t) - [0\ -1\ 0\ 0][\Phi^{(2)}_{\gamma\psi}(t) + T_{go}\Phi^{(1)}_{\gamma\psi}(t)]\Phi_{\gamma\psi}(T_{go})[a_1(t)\ a_2(t)\ a_3(t)\ a_4(t)]^T - \right.$$

$$\left.[1\ 0][\Phi^{(2)}_\psi(t) + T_{go}\Phi^{(1)}_\psi(t)]\Phi_\psi(T_{go})[a_7(t)\ a_8(t)]^T\right\}$$

$$a^*_{Iy}(t) = -\frac{2}{\alpha}(1 - \alpha T_{go} - e^{-\alpha T_{go}})\left(2c + \frac{2T_{go}^3}{3} - \frac{2T_{go}^2}{\alpha} + \frac{2T_{go}}{\alpha^2} + \frac{1}{\alpha^3} - \frac{4T_{go}e^{-\alpha T_{go}}}{\alpha^2} - \frac{e^{-2\alpha T_{go}}}{\alpha^3}\right)^{-1} \quad [98.2]$$

$$\left\{y_r(t) + T_{go}v_r(t) + \frac{1}{\alpha^2}(1 - \alpha T_{go} - e^{-\alpha T_{go}})\overline{\alpha}_{Iy}(t) - [0\ 1][\Phi^{(2)}_\gamma(t) + T_{go}\Phi^{(1)}_\gamma(t)]\Phi_\gamma(T_{go})[a_5(t)\ a_6(t)]^T\right\}$$

$$a^*_{Iz}(t) = -\frac{2}{\alpha}(1 - \alpha T_{go} - e^{-\alpha T_{go}})\left(2c + \frac{2T_{go}^3}{3} - \frac{2T_{go}^2}{\alpha} + \frac{2T_{go}}{\alpha^2} + \frac{1}{\alpha^3} - \frac{4T_{go}e^{-\alpha T_{go}}}{\alpha^2} - \frac{e^{-2\alpha T_{go}}}{\alpha^3}\right)^{-1} \quad [98.3]$$

$$\left\{z_r(t) + T_{go}\omega_r(t) + \frac{1}{\alpha^2}(1 - \alpha T_{go} - e^{-\alpha T_{go}})\overline{\alpha}_{Iz}(t) - [-1\ 0\ 0\ 0][\Phi^{(2)}_{\gamma\psi}(t) + T_{go}\Phi^{(1)}_{\gamma\psi}(t)]\right.$$

$$\left.\Phi_{\gamma\psi}(T_{go})[a_1(t)\ a_2(t)\ a_3(t)\ a_4(t)]^T - [0\ -1][\Phi^{(2)}_\psi(t) + T_{go}\Phi^{(1)}_\psi(t)]\Phi_\psi(T_{go})[a_7(t)\ a_8(t)]^T\right\}$$

$\phi_{\gamma\psi}$, $\phi_\gamma$ and $\phi_\psi$ are defined as $$\Phi_{\gamma\psi}(\tau) = \frac{1}{2}e^{-\frac{(\Omega_\gamma + \Omega_\psi)\tau}{2}}\begin{bmatrix} \Phi_{\gamma\phi1}(\tau) & \Phi_{\gamma\phi2}(\tau) & \Phi_{\gamma\phi3}(\tau) & \Phi_{\gamma\phi4}(\tau) \\ -\Phi_{\gamma\phi2}(\tau) & \Phi_{\gamma\phi1}(\tau) & -\Phi_{\gamma\phi4}(\tau) & \Phi_{\gamma\phi3}(\tau) \\ -\Phi_{\gamma\phi3}(\tau) & -\Phi_{\gamma\phi4}(\tau) & \Phi_{\gamma\phi1}(\tau) & \Phi_{\gamma\phi2}(\tau) \\ \Phi_{\gamma\phi4}(\tau) & -\Phi_{\gamma\phi3}(\tau) & -\Phi_{\gamma\phi2}(\tau) & \Phi_{\gamma\phi1}(\tau) \end{bmatrix} \quad [99]$$

where $$\phi_{\gamma\psi1}(\tau) = \cos(\gamma+\psi)\tau + \cos(\gamma-\psi)\tau$$

$$\phi_{\gamma\psi2}(\tau) = \sin(\gamma+\psi)\tau + \sin(\gamma-\psi)\tau \quad [100]$$

$$\phi_{\gamma\psi3}(\tau) = \sin(\gamma+\psi)\tau + \sin(\gamma-\psi)\tau$$

$$\phi_{\gamma\psi4}(\tau) = -\cos(\gamma+\psi)\tau + \cos(\gamma-\psi)\tau$$

and $$\Phi_\gamma(\tau) = e^{-\frac{\Omega_\gamma\tau}{2}}\begin{bmatrix} \cos\dot\gamma\tau & \sin\dot\gamma\tau \\ -\sin\dot\gamma\tau & \cos\dot\gamma\tau \end{bmatrix} \quad [101]$$

$$\Phi_\psi(\tau) = e^{-\frac{\Omega_\psi\tau}{2}}\begin{bmatrix} \cos\dot\psi\tau & \sin\dot\psi\tau \\ -\sin\dot\psi\tau & \cos\dot\psi\tau \end{bmatrix}$$

$\phi_{\gamma\psi}^{(1)}$, $\phi_\gamma^{(1)}$ and $\phi_\psi^{(1)}$ are defined as $$\Phi_{\gamma\psi}^{(1)}(t) = \frac{1}{2}\begin{bmatrix} \Phi^{(1)}_{\gamma\psi1}(t) & \Phi^{(1)}_{\gamma\psi2}(t) & \Phi^{(1)}_{\gamma\psi3}(t) & \Phi^{(1)}_{\gamma\psi4}(t) \\ -\Phi^{(1)}_{\gamma\psi2}(t) & \Phi^{(1)}_{\gamma\psi1}(t) & -\Phi^{(1)}_{\gamma\psi4}(t) & \Phi^{(1)}_{\gamma\psi3}(t) \\ -\Phi^{(1)}_{\gamma\psi3}(t) & -\Phi^{(1)}_{\gamma\psi4}(t) & \Phi^{(1)}_{\gamma\psi1}(t) & \Phi^{(1)}_{\gamma\psi2}(t) \\ \Phi^{(1)}_{\gamma\psi4}(t) & -\Phi^{(1)}_{\gamma\psi3}(t) & -\Phi^{(1)}_{\gamma\psi2}(t) & \Phi^{(1)}_{\gamma\psi1}(t) \end{bmatrix} \quad [102]$$

-continued $$\Phi^{(1)}_{\gamma\psi1}(t) = \Phi^{(1)}_{\cos}(\Omega_\gamma + \Omega_\psi, \dot\gamma + \dot\psi) + \Phi^{(1)}_{\cos}(\Omega_\gamma + \Omega_\psi, \dot\gamma - \dot\psi) \quad [103]$$

$$\Phi^{(1)}_{\gamma\psi2}(t) = \Phi^{(1)}_{\sin}(\Omega_\gamma + \Omega_\psi, \dot\gamma + \dot\psi) - \Phi^{(1)}_{\sin}(\Omega_\gamma + \Omega_\psi, \dot\gamma - \dot\psi)$$

$$\Phi^{(1)}_{\gamma\psi3}(t) = \Phi^{(1)}_{\sin}(\Omega_\gamma + \Omega_\psi, \dot\gamma + \dot\psi) + \Phi^{(1)}_{\sin}(\Omega_\gamma + \Omega_\psi, \dot\gamma - \dot\psi)$$

$$\Phi^{(1)}_{\gamma\psi4}(t) = -\Phi^{(1)}_{\cos}(\Omega_\gamma + \Omega_\psi, \dot\gamma + \dot\psi) + \Phi^{(1)}_{\cos}(\Omega_\gamma + \Omega_\psi, \dot\gamma - \dot\psi)$$

$$\Phi_\gamma^{(1)}(t) = \begin{bmatrix} \Phi^{(1)}_{\cos}(\Omega_\gamma, \dot\gamma) & \Phi^{(1)}_{\sin}(\Omega_\gamma, \dot\gamma) \\ -\Phi^{(1)}_{\sin}(\Omega_\gamma, \dot\gamma) & \Phi^{(1)}_{\cos}(\Omega_\gamma, \dot\gamma) \end{bmatrix} \quad [104]$$

$$\Phi_\psi^{(1)}(t) = \begin{bmatrix} \Phi^{(1)}_{\cos}(\Omega_\psi, \dot\psi) & \Phi^{(1)}_{\sin}(\Omega_\psi, \dot\psi) \\ -\Phi^{(1)}_{\sin}(\Omega_\psi, \dot\psi) & \Phi^{(1)}_{\cos}(\Omega_\psi, \dot\psi) \end{bmatrix} \quad [105]$$

where $$\Phi^{(1)}_{\sin}(\Omega, \omega) = \frac{1}{\frac{\Omega^2}{4} + \omega^2}\left[\omega\left(1 - e^{-\frac{\Omega T_{go}}{2}}\cos\omega T_{go}\right) + \frac{\Omega}{2}e^{-\frac{\Omega T_{go}}{2}}\sin\omega T_{go}\right] \quad [106]$$

$$\Phi^{(1)}_{\cos}(\Omega, \omega) = \frac{1}{\frac{\Omega^2}{4} + \omega^2}\left[\frac{\Omega}{2}\left(1 - e^{-\frac{\Omega T_{go}}{2}}\cos\omega T_{go}\right) - \omega e^{-\frac{\Omega T_{go}}{2}}\sin\omega T_{go}\right]$$

$\phi_{\gamma\psi}^{(2)}$, $\phi_{\gamma}^{(2)}$ and $\phi_{\psi}^{(2)}$ are defined as $$\Phi_{\gamma\psi}^{(2)}(t) = \frac{1}{2}\begin{bmatrix} \Phi_{\gamma\psi 1}^{(2)}(t) & \Phi_{\gamma\psi 2}^{(2)}(t) & \Phi_{\gamma\psi 3}^{(2)}(t) & \Phi_{\gamma\psi 4}^{(2)}(t) \\ -\Phi_{\gamma\psi 2}^{(2)}(t) & \Phi_{\gamma\psi 1}^{(2)}(t) & -\Phi_{\gamma\psi 4}^{(2)}(t) & \Phi_{\gamma\psi 3}^{(2)}(t) \\ -\Phi_{\gamma\psi 3}^{(2)}(t) & -\Phi_{\gamma\psi 4}^{(2)}(t) & \Phi_{\gamma\psi 1}^{(2)}(t) & \Phi_{\gamma\psi 2}^{(2)}(t) \\ \Phi_{\gamma\psi 4}^{(2)}(t) & -\Phi_{\gamma\psi 3}^{(2)}(t) & -\Phi_{\gamma\psi 2}^{(2)}(t) & \Phi_{\gamma\psi 1}^{(2)}(t) \end{bmatrix} \quad [107]$$

$$\Phi_{\gamma\psi 1}^{(2)}(t) = \Phi_{\cos}^{(2)}(\Omega_\gamma + \Omega_\psi, \dot\gamma + \dot\psi) + \Phi_{\cos}^{(2)}(\Omega_\gamma + \Omega_\psi, \dot\gamma - \dot\psi) \quad [108]$$

$$\Phi_{\gamma\psi 2}^{(2)}(t) = \Phi_{\sin}^{(2)}(\Omega_\gamma + \Omega_\psi, \dot\gamma + \dot\psi) - \Phi_{\sin}^{(2)}(\Omega_\gamma + \Omega_\psi, \dot\gamma - \dot\psi)$$

$$\Phi_{\gamma\psi 3}^{(2)}(t) = \Phi_{\sin}^{(2)}(\Omega_\gamma + \Omega_\psi, \dot\gamma + \dot\psi) + \Phi_{\sin}^{(2)}(\Omega_\gamma + \Omega_\psi, \dot\gamma - \dot\psi)$$

$$\Phi_{\gamma\psi 4}^{(2)}(t) = -\Phi_{\cos}^{(2)}(\Omega_\gamma + \Omega_\psi, \dot\gamma + \dot\psi) + \Phi_{\cos}^{(2)}(\Omega_\gamma + \Omega_\psi, \dot\gamma - \dot\psi)$$

$$\Phi_{\gamma}^{(2)}(t) = \begin{bmatrix} \Phi_{\cos}^{(2)}(\Omega_\gamma, \dot\gamma) & \Phi_{\sin}^{(2)}(\Omega_\gamma, \dot\gamma) \\ -\Phi_{\sin}^{(2)}(\Omega_\gamma, \dot\gamma) & \Phi_{\cos}^{(2)}(\Omega_\gamma, \dot\gamma) \end{bmatrix} \quad [109]$$

$$\Phi_{\psi}^{(2)}(t) = \begin{bmatrix} \Phi_{\cos}^{(2)}(\Omega_\psi, \dot\psi) & \Phi_{\sin}^{(2)}(\Omega_\psi, \dot\psi) \\ -\Phi_{\sin}^{(2)}(\Omega_\psi, \dot\psi) & \Phi_{\cos}^{(2)}(\Omega_\psi, \dot\psi) \end{bmatrix} \quad [110]$$

where $$\Phi_{\sin}^{(2)}(\Omega, \omega) = \frac{-1}{\frac{\Omega^2}{4}+\omega^2}\left[\omega T_{go} + \frac{\omega\Omega}{\frac{\Omega^2}{4}+\omega^2}\left(1 - e^{\frac{\Omega T_{go}}{2}}\cos\omega T_{go}\right) + \frac{\frac{\Omega^2}{4}-\omega^2}{\frac{\Omega^2}{4}+\omega^2}e^{\frac{\Omega T_{go}}{2}}\sin\omega T_{go}\right] \quad [111]$$

$$\Phi_{\cos}^{(2)}(\Omega, \omega) = \frac{-1}{\frac{\Omega^2}{4}+\omega^2}\left[\frac{\Omega T_{go}}{2} + \frac{\frac{\Omega^2}{4}-\omega^2}{\frac{\Omega^2}{4}+\omega^2}\left(1 - e^{\frac{\Omega T_{go}}{2}}\cos\omega T_{go}\right) - \frac{\omega\Omega}{\frac{\Omega^2}{4}+\omega^2}e^{\frac{\Omega T_{go}}{2}}\sin\omega T_{go}\right]$$

3.5 Summary

The design and implementation procedures of the TAE/LQGL processing structure shown in FIG. 7 are now summarized. The processing may be done with one or more processors in operative communication with the output of one or more sensors and with the receiving portion of an interceptor autopilot.

3.5.1 Design procedure for generating the parameters within the processing structures The design procedure for the LQGL may be expressed as
1. Select the values of the parameters corresponding to the modeled interceptor dynamics, e.g., for the first order lag model, one selects a time constant of the lag in interceptor acceleration.
2. Choose design parameters c and Ω experimentally, that is, to choose these parameters according to the acceleration capability of the interceptor, the expected acceleration capability of the target and the desired terminal miss distance, and to tune these parameters in numerical simulation.

The design procedure for the TAE is
1. Determine availability of measurements from two angles (e.g., bearing angles such as elevation and azimuth angles), relative range and relative range rate.
2. Choose design parameters Ω, $\bar\Omega$ and V experimentally, that is to choose these parameters according to the measurement uncertainty and system disturbances, and to tune these parameters in numerical simulation.
3. Choose initial $\bar P$ and $\bar X$ experimentally, that is, to choose these parameters according to the measurements uncertainty and system disturbances, and to tune these parameters in numerical simulation.

Note that the guidance gain can be calculated online because its solution is in closed form. Also note that the filter gain has to be calculated online because of the linearization of f and h around $\bar x$.

3.5.2 Implementation procedure

At every sampling time, the following steps are performed.
1. Acquire the input of the TAE/LQGL processing structure from the sensors chosen in a system or subsystem design procedure and the sensors that measure the interceptor's own velocity and acceleration.
2. Perform filter measurement update.
   Determine a linearized measurement matrix as in equation 56 by using the a priori state estimate and interceptor velocity measurements.
   Determine an a posteriori state estimate and an a posteriori error covariance as in equation 54 by using a priori state estimate, a priori error covariance and measurements.
3. Generate interceptor acceleration command.
   Determine the target angular velocity as in equation 79 by applying the a posteriori state estimate and interceptor velocity measurement.
   Determine a time-to-go as in equation 82 by applying the a posteriori state estimate.
   Determine interceptor acceleration command as in equation 58 by using the a posteriori state estimate, interceptor acceleration measurement, target angular velocity and time-to-go.
4. Send interceptor acceleration command as the output of the TAE/LQGL structural processing to the autopilot to generate interceptor acceleration.
5. Perform filter time propagation.
   Determine a linearized state matrix as in equation 51 by using the a priori state estimate and interceptor velocity measurement.
   Determine the a priori state estimate, a priori error covariance and state covariance as in equation 50 and equation 52 by using the a posteriori state estimate and the a posteriori error covariance as the initial condition and interceptor acceleration measurement.

3.6 Numerical Example

In this section, a numerical example is described in order to demonstrate the performance of a special case of the TAE/LQGL processing structure. This example stimulates the intercept of a target ballistic vehicle in a scenario depicted in FIG. 3 and FIG. 4. The initial distance, i.e., relative range, between the target and interceptor is 50 km. The initial aspect angle is 0, 15 or 30 deg. The initial azimuth is 0, 45, 90, 135, 180, 225, 270 or 315 deg. The initial target velocity is 3 km/s pointing toward the ground. The initial interceptor velocity is 2 km/s with the initial heading angle being 0, 5 or 10 deg off from the collision course associated with a non-maneuvering target. The target acceleration vector is orthogonal to the target velocity vector. There are three different target acceleration vectors starting at range-to-go of 20 km. All three target acceleration vectors have magnitude of 7 g while one does not rotate in the plane that is orthogonal to the target velocity vector and the other two rotate at 0.1 and 2 Hz, respectively.

The magnitude of the interceptor acceleration vector is limited to be below 20 g and has a lag with a first order time constant of 0.1 sec. There are three different measurement sets. The first set only has angle measurement. The second set has angle and range measurements. The third set has angle, range and range rate measurements. The measurements are updated at 100 Hz. There are two levels of sensor noise. The larger sensor noise has standard deviation of 0.001 rad for the angle measurement, 1 m for the range measurement and 1 m/s for the range rate measurement. The smaller sensor noise has standard deviation of 0.0001 rad for the angle measurement, 0.1 m for the range measurement and 0.1 m/s for the range rate measurement.

The special case of the TAE/LQGL processing structure is designed for the three measurement sets with two levels of sensor noise and evaluated under the three target accelerations using Monte-Carlo analysis. For each case, 100 simulation runs are conducted and 90% of the data are used to calculate the averaged miss distance. The averaged miss distance as a result of the use of the TAE/LQGL processing structure when the larger sensor noise is simulated is summarized in Table 3. The averaged miss distance as a result of the TAE/LQGL when the smaller sensor noise is simulated is summarized in Table 4. In both Tables, the first, second and third rows represent the three cases where the target acceleration does not rotate, rotates at 0.1 Hz and rotates at 2 Hz, respectively. The first, second and third columns represent the there where different measurement sets are used. These results show that the special case of the TAE/LQGL processing structure has hit-to-kill capability for all three target accelerations under the ballistic missile defense scenario.

TABLE 3

Simulated averaged miss distance for interceptor having lower quality sensor modeled.

| | Measurement | | |
|---|---|---|---|
| Target maneuver | Angles | Angles & Range | Angles, Range & Range Rate |
| No rotation | 0.2524 m | 0.2161 m | 0.1802 m |
| Rotate at 0.1 Hz | 0.4241 m | 0.3591 m | 0.2791 m |
| Rotate at 2 Hz | 0.7040 m | 0.6987 m | 0.6743 m |

TABLE 4

Simulated averaged miss distance for interceptor having higher quality sensor modeled.

| | Measurement | | |
|---|---|---|---|
| Target maneuver | Angles | Angles & Range | Angles, Range & Range Rate |
| No rotation | 0.0313 m | 0.0323 m | 0.0245 m |
| Rotate at 0.1 Hz | 0.0323 m | 0.0341 m | 0.0263 m |
| Rotate at 2 Hz | 0.8839 m | 0.6093 m | 0.4125 m |

Although the description above contains many specifications, these should not be construed as limiting the scope of the invention but as merely providing illustrations of some of the presently preferred embodiments of this invention. Therefore, the invention has been disclosed by way of example and not limitation, and reference should be made to the following claims to determine the scope of the present invention.

What is claimed is:

1. A processing structure configured in one or more processors for generating a vehicle command for an intercept, the processing structure comprising:

a target acceleration blocking filter (TABF), configured in the one or more processors, wherein the TABF is adapted to receive one or more measures of at least one of: a first bearing angle, a second bearing angle, relative range and relative range rate; and wherein the TABF is adapted to estimate a state vector comprising at least one relative position component and at least one relative velocity component and wherein the TABF is adapted to block a dynamic effect of unmeasured target acceleration;

a game theoretic guidance law (GTGL), configured in the one or more processors, comprising a gain matrix generated for an anticipated worst possible target acceleration solution, wherein the GTGL is adapted to generate an acceleration command based on the estimated state vector and one or more values selected from the gain matrix according to a time-to-go value; and means for outputting a generated vehicle acceleration command signal.

2. The processing structure configured in one or more processors of claim 1 wherein the TABF is further adapted to estimate a state vector comprising three relative position components and three relative velocity components.

3. The processing structure configured in one or more processors of claim 1 wherein the gain matrix is in table form.

4. A method of generating a vehicle command for a target intercept, the steps comprising:

measuring at least one of a first bearing angle, a second bearing angle, relative range and relative range rate;

measuring vehicle velocity and vehicle acceleration;

generating a linearized measurement matrix base on an a priori state estimate;

generating an a posteriori state estimate and an a posteriori error covariance based on the a priori state estimate, an a priori error covariance and at least one of: the measured first bearing angle, the measured second bearing angle, the measured relative range, and the measured relative range rate;

determining an estimate of a time-to-go value based on the a posteriori state estimate;

determining a number of remaining stages by applying the estimated time-to-go value;

determining a guidance gain through table lookup based on the number of remaining stages;

determining the vehicle command based on the guidance gain and the a posteriori state estimate;

determining a two-dimensional target acceleration direction estimate based on the a posteriori state estimate and a vehicle velocity measurement;

determining an update for the a priori state estimate and an update for the a priori error covariance by using the a posteriori state estimate, the a posteriori error covariance and a vehicle acceleration measurement; and communicating the vehicle command to a vehicle actuator.

5. A processing structure configured in one or more processors for generating a vehicle command for an intercept, the processing structure comprising:

a target acceleration estimator (TAE), configured in the one or more processors, wherein the TAE is adapted to receive one or more measures of at least one of: a first bearing angle, a second bearing angle, relative range and relative range rate; and wherein the TAE is adapted to estimate a state vector comprising at least one relative position component and at least one relative velocity component wherein the target acceleration being estimated by the TAE is presumed to have a constant magnitude and a constant bank angle rate;

a linear quadratic guidance law (LQGL), configured in the one or more processors, the LQGL comprising a closed-form solution for at least one vehicle command based on: (a) the estimated state vector of the TAE, (b) the estimated target acceleration of the TAE, (c) the closed-form solution; and means for outputting the at least one vehicle command solution.

6. The processing structure configured in one or more processors of claim 5 wherein the TAE is further adapted to estimate a state vector comprising three relative position components and three relative velocity components.

7. The processing structure configured in one or more processors of claim 5 wherein the closed-form solution is a gain matrix and wherein the LQGL is adapted to generate an acceleration command based on: the estimated state vector, the estimated target acceleration and the gain matrix based on a time-to-go value and a target angular velocity value.

8. The processing structure configured in one or more processors of claim 5 wherein the at least one vehicle command solution is a generated vehicle acceleration command signal.

9. A method of generating a vehicle command for a target intercept, the steps comprising:

measuring at least one of a first bearing angle, a second bearing angle, relative range and relative range rate;

measuring vehicle velocity and vehicle acceleration;

determining a linearized measurement matrix based on an a priori state estimate and the measured vehicle velocity;

determining an a posteriori state estimate and an a posteriori error covariance based on the a priori state estimate, an a priori error covariance and at least one of: the measured first bearing angle, the measured second bearing angle, and the measured relative range;

estimating a target angular velocity based on the a posteriori state estimate and the measured vehicle velocity;

estimating a time-to-go value based on the a posteriori state estimate;

determining a vehicle command by using the a posteriori state estimate, the measured vehicle acceleration, the estimated target angular velocity and the estimated time-to-go;

determining a linearized state matrix based on the a priori state estimate and the measured vehicle velocity;

updating, based on the a posteriori state estimate and the a posteriori error covariance and the measured vehicle acceleration; the a priori state estimate, the a priori error covariance and the state covariance; and communicating the vehicle command to a vehicle actuator.

* * * * *